(12) United States Patent
Adema et al.

(10) Patent No.: US 12,092,823 B2
(45) Date of Patent: Sep. 17, 2024

(54) SYSTEMS, DEVICES, AND METHODS FOR INPUTTING LIGHT FROM A SCANNING LASER PROJECTOR INTO A WAVEGUIDE

(71) Applicant: GOOGLE LLC, Mountain View, CA (US)

(72) Inventors: Daniel Adema, Kitchener (CA); Stuart James Myron Nicholson, Waterloo (CA); Ian Andrews, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 434 days.

(21) Appl. No.: 17/204,308

(22) Filed: Mar. 17, 2021

(65) Prior Publication Data

US 2022/0269077 A1 Aug. 25, 2022

Related U.S. Application Data

(60) Provisional application No. 63/015,939, filed on Apr. 27, 2020.

(51) Int. Cl.
| | |
|---|---|
| *G02B 27/01* | (2006.01) |
| *G02B 17/08* | (2006.01) |
| *G02B 26/10* | (2006.01) |
| *G02B 27/00* | (2006.01) |

(52) U.S. Cl.
CPC ..... *G02B 27/0172* (2013.01); *G02B 17/0816* (2013.01); *G02B 26/101* (2013.01); *G02B 27/0081* (2013.01); *G02B 2027/0123* (2013.01); *G02B 2027/0178* (2013.01)

(58) Field of Classification Search
CPC ............ G02B 26/0833; G02B 27/4272; G02B 17/008; G02B 17/086; G02B 2027/0178; G02B 2027/0123; G02B 27/0081; G02B 26/101; G02B 17/0816; G02B 27/017
See application file for complete search history.

(56) References Cited

U.S. PATENT DOCUMENTS

| | | | |
|---|---|---|---|
| 2009/0046288 A1 | 2/2009 | Crafts et al. | |
| 2017/0241912 A1* | 8/2017 | Wietzorrek | ........ G01N 21/6456 |
| 2017/0299860 A1 | 10/2017 | Wall et al. | |
| 2019/0212557 A1* | 7/2019 | Waldern | ............. G02B 27/0101 |
| 2019/0278076 A1* | 9/2019 | Chen | ..................... G02B 13/08 |
| 2021/0063894 A1* | 3/2021 | Bauerschmidt | ..... G03F 7/70625 |
| 2021/0278669 A1* | 9/2021 | Fabien | ............... G02B 26/0833 |
| 2021/0285870 A1* | 9/2021 | Ikeda | .................... G01N 21/031 |

* cited by examiner

*Primary Examiner* — Mariam Qureshi

(57) ABSTRACT

A laser projection system utilizes a waveguide having a narrow incoupler for double-bounce mitigation and form factor reduction. An optical scanner includes an optical relay positioned in between two scan mirrors. The first scan mirror scans laser light into the optical relay in a first dimension, and the optical relay and converges the scanned laser light towards a second scan mirror. The second scan mirror scans laser light along a second dimension substantially perpendicular to a path over which the laser light is scanned across the second scan mirror, and the convergence introduced by the optical relay causes the laser light to be scanned as a line or arc path of an exit pupil plane that is coincident with the incoupler. The optical relay may include one or more lenses or may be a monolithic molded structure, which may be an Offner-style relay or a molded reflective relay.

11 Claims, 26 Drawing Sheets

SYSTEMS, DEVICES, AND METHODS FOR INPUTTING LIGHT FROM A SCANNING LASER PROJECTOR INTO A WAVEGUIDE

CROSS-REFERENCE TO RELATED APPLICATION

The present application claims priority to U.S. Provisional Patent Application Ser. No. 63/015,939, entitled "SYSTEMS, DEVICES, AND METHODS FOR INPUTTING LIGHT FROM A SCANNING LASER PROJECTOR INTO A LIGHTGUIDE", and filed on Apr. 27, 2020, the entirety of which is incorporated by reference herein.

BACKGROUND

Some display systems employ a projector, which is an optical device that projects or shines a pattern of light onto another object (e.g., onto a surface of another object, such as onto a projection screen) in order to display an image or video on or via that other object. In projectors employing lasers as light sources (that is, in a "laser projector"), each beam of laser light generated by the laser projector is temporally modulated to provide a pattern of laser light and controllable mirrors, such as digital micromirrors, are typically used to spatially distribute the modulated pattern of laser light over a two-dimensional area of another object. The spatial distribution of the modulated pattern of laser light produces an image at the other object.

SUMMARY

In an example embodiment, a laser projection system includes a first scan mirror configured to scan laser light along a first scanning dimension, an optical relay configured to receive the laser light from the first scan mirror and to relay the laser light, wherein an entrance pupil of the optical relay is coincident with the first scan mirror, a second scan mirror configured to reflect the relayed laser light from the optical relay and to scan the relayed laser light along a second scanning dimension that is different than the first scanning dimension, and a waveguide comprising an incoupler. The second scan mirror is further configured to scan the relayed laser light along a path of an exit pupil plane at the incoupler.

In some embodiments, a ratio of a first dimension of the incoupler to a second dimension of the incoupler is at least 1.33 to 1.

In some embodiments, the optical relay includes a first lens configured to receive the laser light from the first scan mirror, and a second lens configured to receive the laser light from the first lens and to relay the laser light to converge to the exit pupil plane that is coincident with the incoupler after the laser light exits the optical relay.

In some embodiments, at least one of the first lens or the second lens is configured to reshape a cross-section of the laser light by magnifying the laser light in one or both of a first direction and a second direction. The first direction is substantially orthogonal to the second direction.

In some embodiments, the optical relay includes a monolithic molded structure.

In some embodiments, the monolithic molded structure is an Offner-style relay that includes a first spherical mirror and a second spherical mirror that is concentric with the first spherical mirror.

In some embodiments, the Offner-style optical relay further includes a first fold mirror configured to receive the laser light from the first scan mirror and to reflect the laser light toward a first portion of the first spherical mirror and a second fold mirror. The first portion of the first spherical mirror is configured to relay the laser light toward the second spherical mirror, the second spherical mirror is configured to relay the laser light toward a second portion of the first spherical mirror, the second portion of the first spherical mirror is configured to relay the laser light toward the second fold mirror, the second fold mirror is configured to reflect the laser light out of the optical relay toward the second scan mirror, and the second portion of the first spherical mirror is configured to relay the laser light to converge to the exit pupil plane that is coincident with the incoupler after the laser light exits the optical relay.

In some embodiments, the monolithic molded structure is a molded reflective relay that includes a first curved mirror configured to receive the laser light from the first scan mirror and to relay and reflect the laser light, and a second curved mirror configured to receive the laser light from the first curved mirror and to relay and reflect the laser light out of the optical relay toward the second scan mirror.

In some embodiments, the first curved mirror is configured to cause the laser light to converge to an intermediate image plane disposed between the first curved mirror and the second curved mirror, and the second curved mirror is configured to relay the laser light to converge to the exit pupil plane that is coincident with the incoupler after the laser light exits the optical relay.

In some embodiments, the molded reflective relay further includes a first fold mirror disposed in an optical path between the first curved mirror and the second curved mirror following the intermediate image plane, and the first fold mirror is configured to receive the laser light output from the intermediate image plane and to reflect the laser light toward the second curved mirror.

In some embodiments, the molded reflective relay further includes a second fold mirror disposed in an optical path between the first curved mirror and the first fold mirror, prior to the intermediate image plane, and the second fold mirror is configured to receive the laser light from the first curved mirror and to reflect the laser light toward the first fold mirror via the intermediate image plane.

In some embodiments, the laser projection system further includes an optical engine that includes a plurality of laser light sources, each configured to output a respectively different wavelength of laser light, a plurality of primary lenses including a respective primary lens for each of the wavelengths of laser light output by the optical engine, and a beam combiner configured to receive the wavelengths of laser light from the optical engine via the primary lenses and to combine the wavelengths of laser light to produce the laser light that the first scan mirror is configured to receive.

In some embodiments, the waveguide further includes an exit pupil expander and an outcoupler. The exit pupil expander includes a diffraction grating configured to receive the relayed laser light from the incoupler. The incoupler is configured to redirect the relayed laser light toward the exit pupil expander in a first direction that is substantially perpendicular to the path across which the relayed laser light is scanned across the incoupler. The outcoupler is configured to receive the laser light from the diffraction grating of the exit pupil expander and to redirect the relayed laser light out of the waveguide. The grating of the exit pupil expander is configured to redirect the laser light toward the outcoupler in a second direction that is substantially perpendicular to the first direction.

In some embodiments, the path along which the second scan mirror is configured to scan the relayed laser light is substantially linear.

In some embodiments, the path along which the second scan mirror is configured to scan the relayed laser light is substantially non-linear.

In some embodiments, the incoupler includes a curved edge, and the second scan mirror is configured to scan the relayed laser light along an arc at the curved edge of the incoupler.

In some embodiments, the second scan mirror is tilted such that a long dimension of the second scan mirror is not parallel with a plane of the waveguide.

In some embodiments, the first scan mirror is tilted such that the central ray of the laser light scanned by the first scan mirror is not perpendicular to a long dimension of the second scan mirror.

In some embodiments, a near-eye display includes the laser projection system, and further includes an eyeglasses frame that surrounds at least a portion of the laser projection system, and an eyeglasses lens, and the laser projection system is configured to output the relayed laser light through at least a portion of the eyeglasses lens.

In an example embodiment, a near-eye display includes a laser projection system that includes a waveguide including an incoupler and that includes an optical scanner configured to scan laser light along a path at the incoupler of the waveguide, the path extending along a first dimension and comprising a plurality of points. The scanned laser light is incident on each point of the plurality of points along the path from a plurality of angles of incidence, and the plurality of angles of incidence for a given point of the plurality of points are offset with respect to one another in a second dimension that is orthogonal to the first dimension.

In some embodiments, the optical scanner includes a first scan mirror configured to scan the laser light along a first scanning dimension, an optical relay configured to receive the laser light from the first scan mirror and to relay the laser light, an entrance pupil of the optical relay being coincident with the first scan mirror, and a second scan mirror configured to receive the laser light from the optical relay and to scan the laser light along a second scanning dimension along the path at the incoupler. The optical relay, by relaying the laser light, causes the laser light to converge to the path at the incoupler, and the path corresponds to an exit pupil plane of the optical relay.

In some embodiments, the optical relay includes a first lens configured to receive the laser light from the first scan mirror and to relay the laser light toward the second lens, and a second lens configured to receive the laser light from the first lens and to relay the laser light out of the optical relay toward the second scan mirror.

In some embodiments, at least one of the first lens and the second lens is configured to reshape a cross-section of the laser light.

In some embodiments, the optical relay comprises a monolithic molded structure.

In some embodiments, the monolithic molded structure is an Offner-style optical relay that includes a first spherical mirror and a second spherical mirror that is concentric with the first spherical mirror.

In some embodiments, the Offner-style optical relay further includes a first fold mirror configured to receive the laser light from the first scan mirror and to reflect the laser light toward a first portion of the first spherical mirror and further includes a second fold mirror. The first portion of the first spherical mirror is configured to relay and reflect the laser light toward the second spherical mirror, the second spherical mirror is configured to relay the laser light toward a second portion of the first spherical mirror, the second portion of the first spherical mirror is configured to relay and reflect the laser light toward the second fold mirror, the second fold mirror is configured to reflect the laser light out of the optical relay toward the second scan mirror, and the second portion of the first spherical mirror is configured to relay the laser light to converge to the exit pupil plane after the laser light exits the optical relay.

In some embodiments, the monolithic molded structure is a molded reflective relay that includes a first curved mirror configured to receive the laser light from the first scan mirror and to relay and reflect the laser light, and a second curved mirror configured to receive the laser light from the first curved mirror and to relay and reflect the laser light out of the optical relay toward the second scan mirror.

In some embodiments, the first curved mirror is configured to cause the laser light to converge to an intermediate image plane disposed between the first curved mirror and the second curved mirror, and the second curved mirror is configured to relay the laser light to converge to the exit pupil plane after the laser light exits the optical relay.

In some embodiments, the molded reflective relay further includes a first fold mirror disposed in an optical path between the first curved mirror and the second curved mirror following the intermediate image plane, and the first fold mirror is configured to receive the laser light output from the intermediate image plane and to reflect the laser light toward the second curved mirror.

In some embodiments, the molded reflective relay further includes a second fold mirror disposed in an optical path between the first curved mirror and the first fold mirror, prior to the intermediate image plane, and the second fold mirror is configured to receive the laser light from the first curved mirror and to reflect the laser light toward the first fold mirror via the intermediate image plane.

In some embodiments, the near-eye display further includes an optical engine that includes a plurality of laser light sources, each configured to output a respectively different wavelength of laser light, a plurality of primary lenses comprising a respective primary lens for each of the wavelengths of laser light output by the optical engine, and a beam combiner configured to receive the wavelengths of laser light from the optical engine via the primary lenses and to combine the wavelengths of laser light to produce the laser light that is received by the first scan mirror.

In some embodiments, the waveguide further includes an exit pupil expander and an outcoupler. The exit pupil expander includes including a diffraction grating configured to receive the laser light from the incoupler. The incoupler is configured to redirect the laser light toward the exit pupil expander in a first direction that is substantially perpendicular to the path across which the laser light is scanned across the incoupler. The outcoupler is configured to receive the laser light from the diffraction grating of the exit pupil expander and to redirect the laser light out of the waveguide. The diffraction grating of the exit pupil expander is configured to redirect the laser light toward the outcoupler in a second direction that is substantially perpendicular to the first direction.

In some embodiments, the path along which the second scan mirror is configured to scan the relayed laser light is substantially linear.

In some embodiments, the path along which the second scan mirror is configured to scan the relayed laser light is substantially non-linear.

In some embodiments, the incoupler includes a curved edge, and the second scan mirror is configured to scan the relayed laser light along an arc at the curved edge of the incoupler.

In some embodiments, the second scan mirror is tilted such that a long dimension of the second scan mirror is not parallel with a plane of the waveguide.

In some embodiments, the first scan mirror is tilted such that the central ray of the laser light scanned by the first scan mirror is not perpendicular to a long dimension of the second scan mirror.

In some embodiments, the near-eye display further includes an eyeglasses frame that surrounds at least a portion of the laser projection system, and an eyeglasses lens. The laser projection system is configured to output the laser light through at least a portion of the eyeglasses lens.

In an example embodiment, a method includes steps of scanning, with a first scan mirror, laser light along a first scanning dimension, receiving, with an optical relay, the laser light from the first scan mirror and relaying the laser light, an entrance pupil plane of the optical relay being coincident with the first scan mirror, receiving, with a second scan mirror, the relayed laser light from the optical relay, and scanning, with the second scan mirror, the relayed laser light along a second scanning dimension that is different than the first scanning dimension along a path at an incoupler of a waveguide.

In an example embodiment, the method includes steps of receiving, with a first lens, the laser light from the first scan mirror, receiving, with a second lens, the laser light from the first lens, and relaying, with the second lens, the laser light to converge to an exit pupil plane that is coincident with the incoupler after the laser light exits the optical relay.

In some embodiments, the method includes a step of reshaping, with at least one of the first lens and the second lens, a cross-section of the laser light.

In some embodiments, the method includes steps of receiving, with a first fold mirror of the optical relay, the laser light from the first scan mirror, reflecting, with the first fold mirror, the laser light toward a first portion of a first spherical mirror of the optical relay, relaying, with the first portion of the first spherical mirror, the laser light toward a second spherical mirror of the optical relay, relaying, with the second spherical mirror, the laser light toward a second portion of the first spherical mirror, relaying, with the second portion of the first spherical mirror, the laser light toward a second fold mirror of the optical relay, and reflecting, with the second fold mirror, the laser light out of the optical relay toward the second scan mirror. Relaying the laser light by the second portion of the first spherical mirror causes the laser light to converge to an exit pupil plane that is coincident with the incoupler after the laser light exits the optical relay.

In some embodiments, the method includes steps of receiving, with a first curved mirror of the optical relay, the laser light from the first scan mirror, relaying, with the first curved mirror, the laser light toward a second curved mirror of the optical relay, receiving, with the second curved mirror, the laser light from the first curved mirror, and relaying, with the second curved mirror, the laser light out of the optical relay toward the second scan mirror.

In some embodiments, the method includes steps of causing, with the first curved mirror, the laser light to converge to an intermediate image plane disposed between the first curved mirror and the second curved mirror, and relaying, with the second curved mirror, the laser light to converge to an exit pupil plane that is coincident with the incoupler after the laser light exits the optical relay.

In some embodiments, the method includes steps of receiving, with a first fold mirror of the optical relay, the laser light output from the intermediate image plane, and reflecting, with the first fold mirror, the laser light toward the second curved mirror.

In some embodiments, the method includes steps of receiving, with a second fold mirror of the optical relay, the laser light from the first curved mirror, and reflecting, with the second fold mirror, the laser light toward the first fold mirror via the intermediate image plane.

In some embodiments, the method includes steps of generating, with an optical engine, a plurality of wavelengths of laser light, receiving, with a beam combiner, the plurality of wavelengths of laser light from the optical engine via a plurality of primary lenses, and combining, with the beam combiner, the wavelengths of laser light to produce the laser light that the first scan mirror receives.

In some embodiments, the method includes steps of redirecting, with the incoupler, the relayed laser light toward a diffraction grating of an exit pupil expander of the waveguide in a first direction that is substantially perpendicular to the path across which the relayed laser light is scanned across the incoupler, receiving, with the diffraction grating, the relayed laser light from the incoupler, redirecting, with the diffraction grating, the laser light toward an outcoupler of the waveguide in a second direction that is substantially perpendicular to the first direction, receiving, with the outcoupler, the laser light from the diffraction grating, and redirecting, with the outcoupler, the relayed laser light out of the waveguide.

In some embodiments, the path is substantially linear.

In some embodiments, the path is non-linear.

In some embodiments the method includes a step of scanning, with the second scan mirror, the relayed laser light along an arc at a curved edge of the incoupler.

In some embodiments, the method includes a step of tilting the second scan mirror such that a long dimension of the second scan mirror is not parallel with a plane of the waveguide.

In some embodiments, the method includes a step of tilting the first scan mirror such that the central ray of the laser light scanned by the first scan mirror is not perpendicular to a long dimension of the second scan mirror.

In some embodiments, a near-eye display is configured to perform the method. The near-eye display includes an eyeglasses frame that surrounds at least a portion of the laser projection system and an eyeglasses lens. The laser projection system is configured to output the relayed laser light through at least a portion of the eyeglasses lens.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
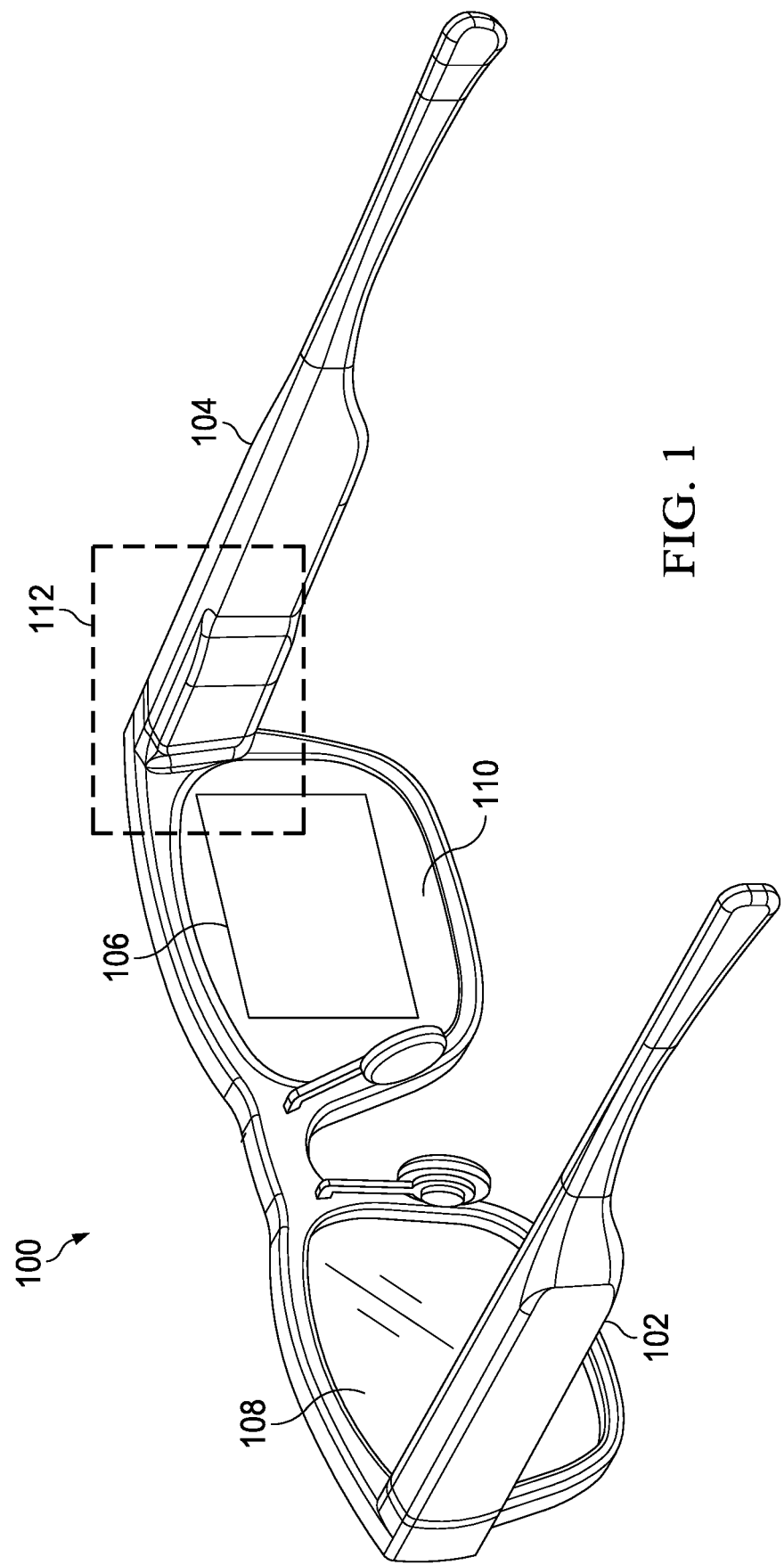
FIG. 1 is a diagram illustrating a display system having an integrated laser projection system, in accordance with some embodiments.

FIGS. 1-33 illustrate embodiments for compactly arranging a near-eye display system (e.g., a wearable heads-up display (WHUD)) or other display system that includes an optical engine having at least one modulatable laser light source, two scan mirrors, an optical relay, and a waveguide. In operation, the at least one modulatable laser light source provides laser light, the two scan mirrors receive the laser light in series, and each scan the laser light over a respective direction (e.g., a first scan mirror may scan the light along a first dimension and a second scan mirror may scan the light along a second dimension, where the second dimension is substantially perpendicular to the first dimension in some embodiments). The waveguide includes an incoupler at which it receives the scanned laser light from the second scan mirror. The incoupler redirects received light through the waveguide, in some instances via an intervening exit pupil expander (EPE) toward an outcoupler of the waveguide so that the light is projected out of the waveguide (e.g., onto the eye of a user).

In conventional optical systems that utilize a waveguide, light that is incoupled by the waveguide can, if not prevented or otherwise accommodated, become incident on the incoupler at least a second time after one or more reflections from one or more surfaces within the waveguide and be undesirably influenced (e.g., outcoupled) by the incoupler upon such second incidence, sometimes referred to as a "double-bounce loss". It should be understood that instances of the term "or" herein refer to the non-exclusive definition of "or", unless noted otherwise. For example, herein the phrase "X or Y" means "either X, or Y, or both".

A frequent challenge in improving the efficiency of an optical system is to minimize any such double-bounce losses. For an optical system with an optical relay, a given location along the incoupler grating receives incoming laser light over a range of input angles, while still propagating the received light along the waveguide within acceptable angles (e.g., angles acceptable to achieve total internal reflection (TIR) within the waveguide). For a given angle and beam width of incoming laser light, it is generally desirable for light incident at the side of the incoupler grating to bounce past the opposite edge of the grating. As the beam width gets larger, as the waveguide thickness gets thinner, or as the grating pitch gets smaller (e.g., with incoupler gratings tuned to higher frequency light, such as light in the blue spectrum, having smaller grating pitches than those tuned to lower frequency light, such as light in the red spectrum) it can occur that light from one side of the grating interacts with the other side of the grating. This second interaction with the grating causes light to exit the waveguide again and not be propagated along the waveguide by TIR, resulting in a double-bounce loss.

For a system without an optical relay (e.g., a "direct scan" system in which a scan mirror scans light directly over a two-dimensional area the incoupler), the incident light sweeps a range of input angles across varying locations at the incoupler grating. In some conventional direct scan laser projection systems, the MEMS mirror is brought as close as possible to the incoupler to somewhat reduce the size of the scanned region, and thereby reducing the size required for the region that includes the incoupler (i.e., "incoupler region"), but such approaches too can result in undesirable double-bounce losses. Embodiments of the display system and optical scanner described herein, are advantageously able to accommodate an incoupler region with a smaller form factor than that of a conventional direct scan system, since they scan laser light along a line or arc at the incoupler, rather than scanning the laser light over a larger two-dimensional area. Reducing the required form factor of the incoupler region in this way results in comparatively fewer double bounce losses, compared to systems with larger incoupler regions.

It should be noted that although the optical systems of the present disclosure are described and illustrated with reference to a particular example near-eye display system in the form of a wearable heads-up display (WHUD), it will be appreciated that the apparatuses and techniques of the present disclosure are not limited to this particular example, but instead may be implemented in any of a variety of display systems using the guidelines provided herein.

FIG. 1 illustrates an example display system 100 employing a scanning-based optic system in accordance with some embodiments. As depicted, the display system 100 has a support structure 102 that includes an arm 104, which houses a laser projection system configured to project images toward the eye of a user, such that the user perceives the projected images as being displayed in a field of view (FOV) area 106 of a display at one or both of lens elements 108, 110 (sometimes referred to herein as "lenses" 108, 110). In the depicted embodiment, the display system 100 is a near-eye display system in the form of a wearable heads-up display (WHUD) in which the support structure 102 is configured to be worn on the head of a user and has a general shape and appearance (that is, form factor) of an eyeglasses (e.g., sunglasses) frame. The support structure 102 contains or otherwise includes various components to facilitate the projection of such images toward the eye of the user, such as a laser projector, an optical scanner, and a waveguide. In some embodiments, the support structure 102 further includes various sensors, such as one or more front-facing cameras, rear-facing cameras, motion sensors, accelerometers, microphones, thermometers, compasses, altimeters, and the like. The support structure 102 further can include one or more radio frequency (RF) interfaces or other wireless interfaces, such as a Bluetooth (TM) interface, a WiFi interface, and the like. Further, in some embodiments, the support structure 102 also includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that in other embodiments the display system 100 may have a different shape and appearance from the eyeglasses frame depicted in FIG. 1.

One or both of the lens elements 108, 110 are used by the display system 100 to provide an augmented reality (AR) display in which rendered graphical content can be superimposed over or otherwise provided in conjunction with a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, one or more scan mirrors, and one or more optical relays. One or both of the lens elements 108, 110 thus include at least a portion of a waveguide that routes display light received by an incoupler of the waveguide to an outcoupler of the waveguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment.

In some embodiments, the projector is a digital light processing-based projector, a scanning laser projector, or any combination of a modulative light source such as a laser or one or more light emitting diodes (LEDs) and a dynamic reflector mechanism such as one or more dynamic scanners or digital light processors. In some embodiments, the projector includes multiple laser diodes (e.g., a red laser diode, a green laser diode, and a blue laser diode) and at least one scan mirror (e.g., two one-dimensional scan mirrors, which may be micro-electromechanical system (MEMS)-based or piezo-based). The projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100. The projector scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. Generally, it is desirable for a display to have a wide FOV to accommodate the outcoupling of light across a wide range of angles. Herein, the range of different user eye positions that will be able to see the display is referred to as the eyebox of the display.

In some embodiments, the projector routes light via first and second scan mirrors, an optical relay disposed between the first and second scan mirrors, and a waveguide disposed at the output of the second scan mirror. In some embodiments, at least a portion of an outcoupler of the waveguide may overlap the FOV area 106. These aspects are described in greater detail below.

Figure 2:
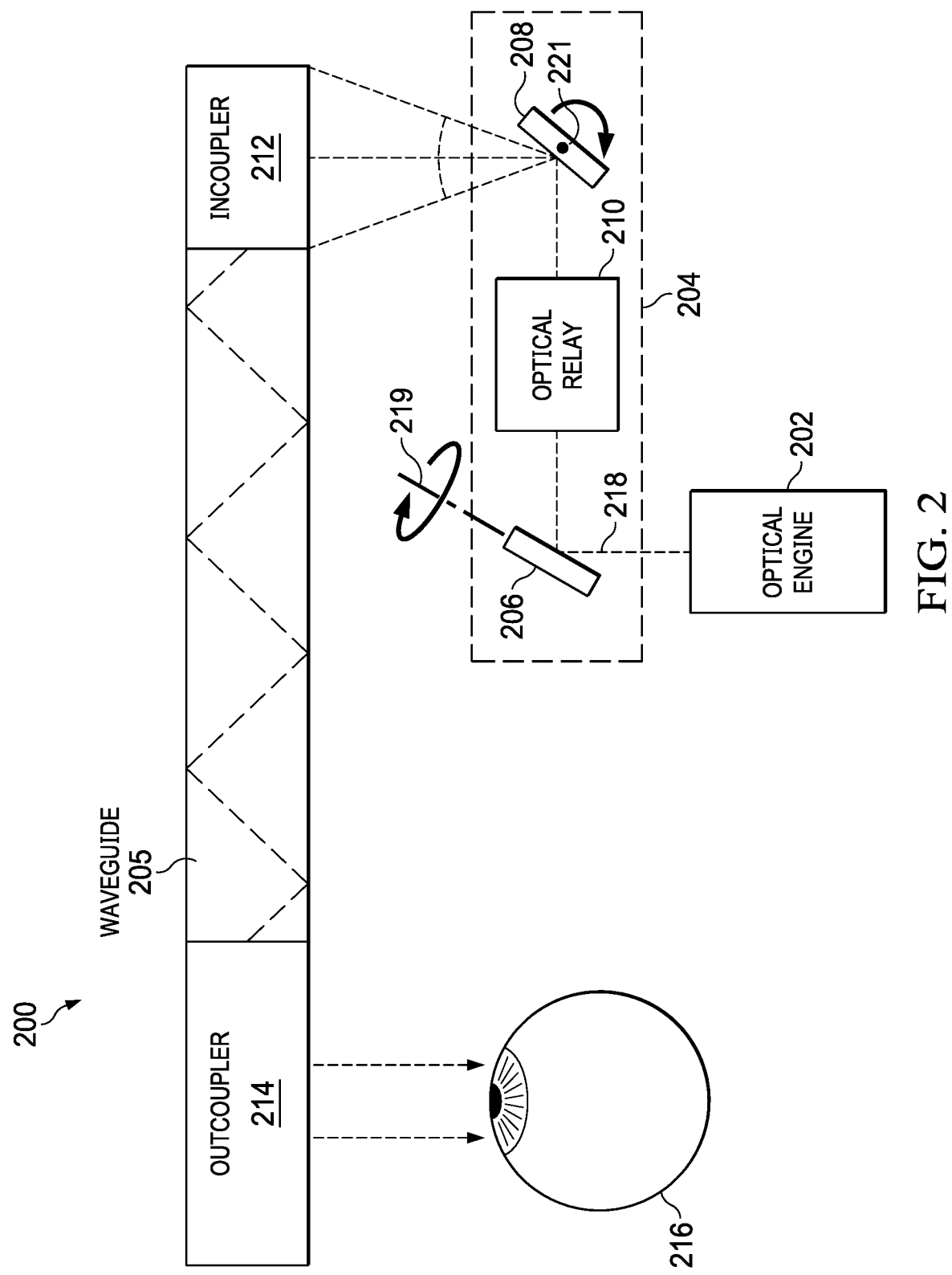
FIG. 2 is a diagram illustrating a laser projection system having an optical scanner that includes an optical relay disposed between two scan mirrors, in accordance with some embodiments.

FIG. 2 illustrates a simplified block diagram of a laser projection system 200 that projects images directly onto the eye of a user via laser light. The laser projection system 200 includes an optical engine 202, an optical scanner 204, and a waveguide 205. The optical scanner 204 includes a first scan mirror 206, a second scan mirror 208, and an optical relay 210. The waveguide 205 includes an incoupler 212 and an outcoupler 214, with the outcoupler 214 being optically aligned with an eye 216 of a user in the present example. In some embodiments, the laser projection system 200 is implemented in a near-eye display system, such as a wearable heads-up display or another display system, such as the display system 100 of FIG. 1.

The optical engine 202 includes one or more laser light sources configured to generate and output laser light 218 (e.g., visible laser light such as red, blue, and green laser light and, in some embodiments, non-visible laser light such as infrared laser light). In some embodiments, the optical engine 202 is coupled to a driver or other controller (not shown), which controls the timing of emission of laser light from the laser light sources of the optical engine 202 in accordance with instructions received by the controller or driver from a computer processor coupled thereto to modulate the laser light 218 to be perceived as images when output to the retina of an eye 216 of a user.

For example, during the operation of the laser projection system 200, multiple laser light beams having respectively different wavelengths are output by the laser light sources of the optical engine 202, then combined via a beam combiner (not shown), before being directed to the eye 216 of the user. The optical engine 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

One or both of the first and second scan mirrors 206 and 208 of the optical scanner 204 are MEMS mirrors in some embodiments. For example, the first scan mirror 206 and the second scan mirror 208 are MEMS mirrors that are driven by respective actuation voltages to oscillate during active operation of the laser projection system 200, causing the first and second scan mirrors 206 and 208 to scan the laser light 218. Oscillation of the first scan mirror 206 causes laser light 218 output by the optical engine 202 to be scanned through the optical relay 210 and across a surface of the second scan mirror 208. The second scan mirror 208 scans the laser light 218 received from the first scan mirror 206 toward an incoupler 212 of the waveguide 205. In some embodiments, the first scan mirror 206 oscillates or otherwise rotates around a first axis 219, such that the laser light 218 is scanned in only one dimension (i.e., along a substantially straight line or an arc) across the surface of the second scan mirror 208. In some embodiments, the second scan mirror 208 oscillates or otherwise rotates around a second axis 221. In some embodiments, the alignment of the first axis 219 is skew with respect to the second axis 221.

In some embodiments, the incoupler 212 has a substantially rectangular profile and is configured to receive the laser light 218 and direct the laser light 218 into the waveguide 205. The incoupler 212 is defined by a smaller dimension (i.e., width) and a larger orthogonal dimension (i.e., length). In an embodiment, the optical relay 210 is a line-scan optical relay that receives the laser light 218 scanned in a first dimension by the first scan mirror 206 (e.g., the first dimension corresponding to the small dimension of the incoupler 212), routes the laser light 218 to the second scan mirror 208, and introduces a convergence to the laser light 218 (e.g., via collimation) in the first dimension to an exit pupil plane of the optical relay 210 beyond the second scan mirror 208. Herein, an "exit pupil plane" in an optical system (e.g., the optical relay 210) refers to the location along the optical path through the optical system where light converges to a virtual aperture before exiting the optical system. For example, the possible optical paths of the laser light 218, following reflection by the first scan mirror 206, are initially spread along a first scanning dimension, but later these paths intersect at an exit pupil plane beyond the second scan mirror 208 due to convergence introduced by the optical relay 210. For example, the width (i.e., smallest dimension) of a given exit pupil plane approximately corresponds to the diameter of the laser light corresponding to that exit pupil plane. Accordingly, the exit pupil plane can be considered a "virtual aperture". In some embodiments, the exit pupil plane of the optical relay 210 is coincident with the incoupler 212.

According to various embodiments, the optical relay 210 includes one or more spherical, aspheric, parabolic, or freeform lenses that shape and relay the laser light 218 on the second scan mirror 208 or includes a molded reflective relay that includes two or more optical surfaces that include, but are not limited to, spherical, aspheric, parabolic, or freeform lenses or reflectors (sometimes referred to as "reflective surfaces" herein), which shape and direct the laser light 218 onto the second scan mirror 208. The second scan mirror 208 receives the laser light 218 and scans the laser light 218 in a second dimension, the second dimension corresponding to the long dimension of the incoupler 212 of the waveguide 205. In some embodiments, the second scan mirror 208 causes the laser light 218 to be swept along a line along the second dimension at the exit pupil plane. In some embodiments, the incoupler 212 is positioned at or near the swept line downstream from the second scan mirror 208 such that the second scan mirror 208 scans the laser light 218 along a path (e.g., a substantially straight line or an arc) over the incoupler 212.

In some embodiments, the optical engine 202 includes an edge-emitting laser (EEL) that emits a laser light 218 having a substantially elliptical, non-circular cross-section, and the optical relay 210 magnifies or minimizes the laser light 218 along one or both of a first direction (e.g., the semi-major axis of the beam profile of the laser light 218) or a second direction (e.g., the semi-minor axis of the beam profile of the laser light 218) to circularize the laser light 218 prior to the convergence of the laser light 218 on the second scan mirror 208. In some such embodiments, a surface of a mirror plate of the first scan mirror 206 is elliptical and non-circular (e.g., similar in shape and size to the cross-sectional area of the laser light 218). In other such embodiments, the surface of the mirror plate of the first scan mirror 206 is circular.

The waveguide 205 of the laser projection system 200 includes the incoupler 212 and the outcoupler 214. The term "waveguide," as used herein, will be understood to mean a combiner using one or more of TIR, specialized filters, or reflective surfaces, to transfer light from an incoupler (such as the incoupler 212) to an outcoupler (such as the outcoupler 214). In some display applications, the light is a collimated image, and the waveguide transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, or surface relief holograms. In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the laser light 218 received at the incoupler 212 is relayed to the outcoupler 214 via the waveguide 205 using TIR. The laser light 218 is then output to the eye 216 of a user via the outcoupler 214. As described above, in some embodiments the waveguide 205 is implemented as part of an eyeglass lens, such as the lens 108 or lens 110 (FIG. 1) of the display system having an eyeglass form factor and employing the laser projection system 200.

Although not shown in the example of FIG. 2, in some embodiments additional optical components are included in any of the optical paths between the optical engine 202 and the first scan mirror 206, between the first scan mirror 206 and the optical relay 210, between the optical relay 210 and the second scan mirror 208, between the second scan mirror 208 and the incoupler 212, between the incoupler 212 and the outcoupler 214, or between the outcoupler 214 and the eye 216 (e.g., in order to shape the laser light for viewing by the eye 216 of the user). In some embodiments, a prism is used to steer light from the second scan mirror 208 into the incoupler 212 so that light is coupled into incoupler 212 at the appropriate angle to encourage the propagation of the light in waveguide 205 by TIR. Also, in some embodiments, an exit pupil expander (such as an embodiment of the exit pupil expander 2304 of FIG. 23, described below), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 216 of the user).

Figure 3:
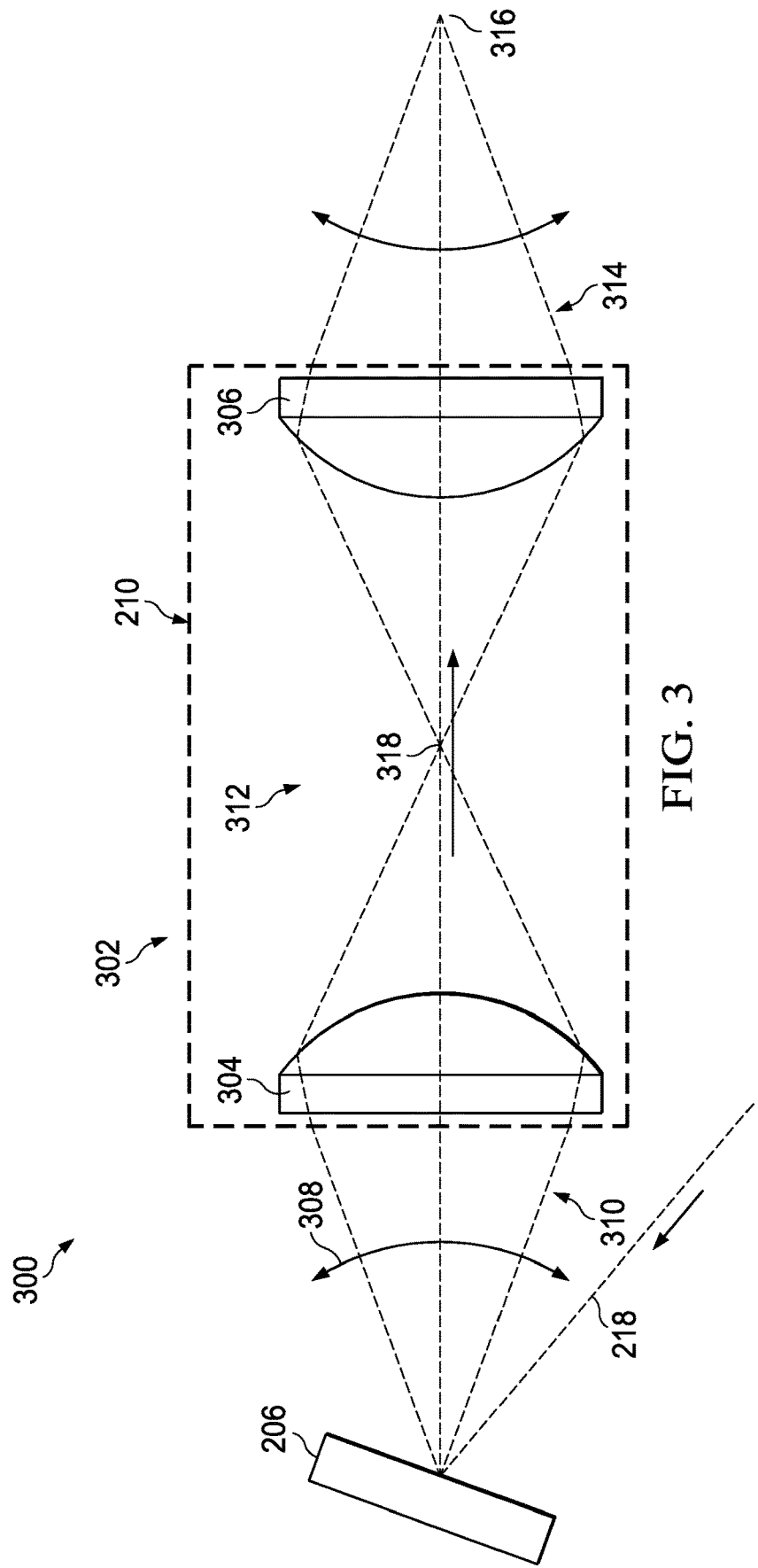
FIG. 3 is a diagram illustrating a side view of an optical scanner having an optical relay that includes first and second lenses, in accordance with some embodiments.
Figure 4:
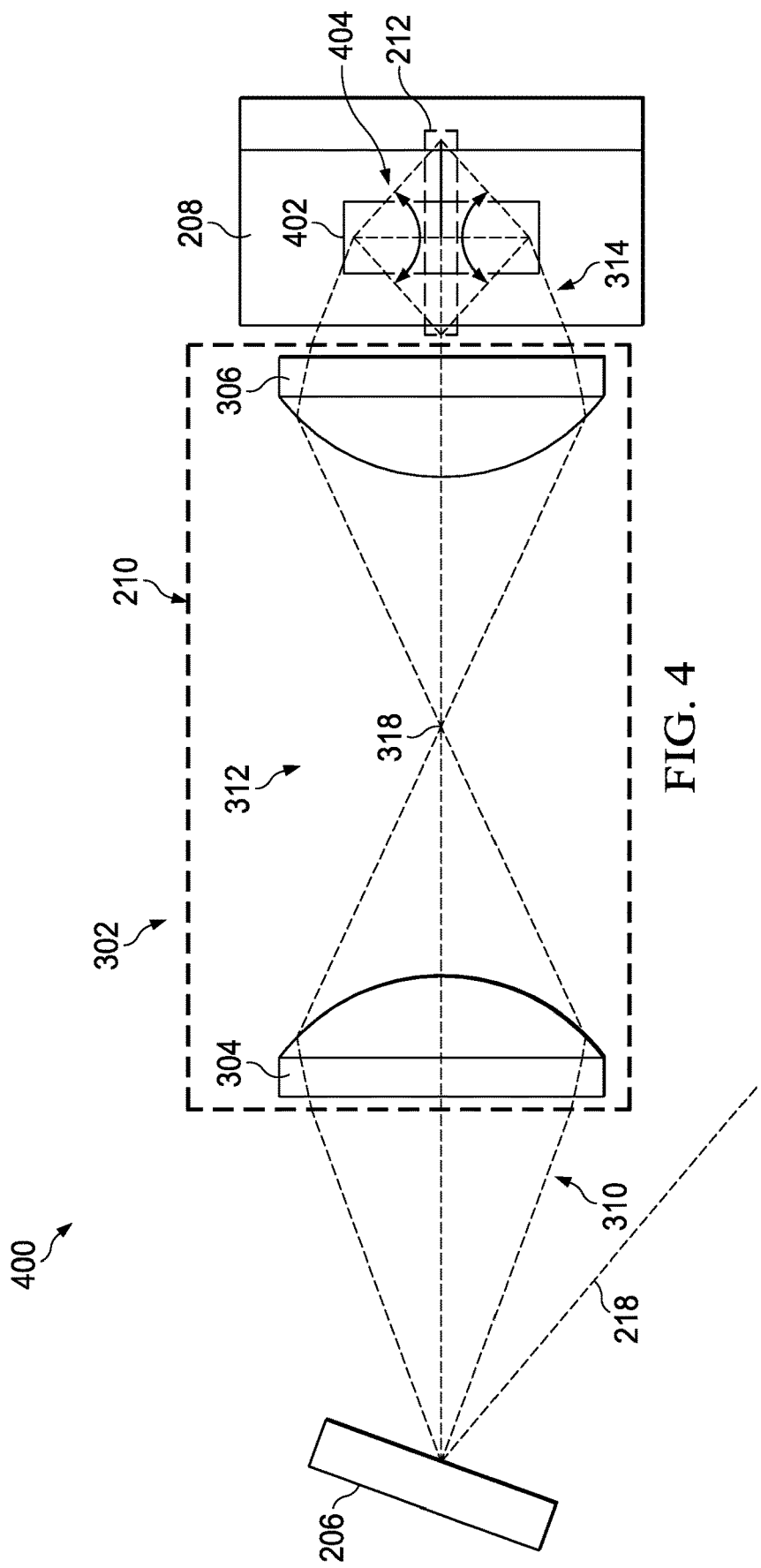
FIG. 4 is a diagram illustrating a side view of the optical scanner of FIG. 3 with a scan mirror included at the output of the optical relay, in accordance with some embodiments.

FIGS. 3 and 4 show illustrative side views 300 and 400 of an optical scanner 302 which corresponds, in the present example, to an embodiment of the optical scanner 204 of FIG. 2, with like elements being accordingly referred to using like reference numerals herein. As shown in the side view 300 of FIG. 3, the optical relay 210 of the optical scanner 302 includes a first lens 304 and a second lens 306 that are arranged in series. In some embodiments, the first and second lenses 304, 306 are shaping lenses (e.g., collimation lenses) that reshape the laser light 218 to have a desired (e.g., circular) cross-sectional shape. As shown, laser light 218 is received at the first scan mirror 206, which scans the laser light 218 along a first scanning dimension 308, such that a pre-relay scan region 310 between the first scan mirror 206 and the optical relay 210 expands along the first scanning dimension 308 as it approaches the optical relay 210. In some embodiments, the first scan mirror 206 is coincident with an entrance pupil of the optical relay 210. The laser light 218 is received by the first lens 304, which passes the laser light 218 along one of several possible optical paths within a relay scan region 312, depending on the location at which the laser light 218 is incident on the first lens 304. The second lens 306 receives the laser light 218 output by the first lens 304 and relays the laser light 218 along an optical path in a post-relay scan region 314, which converges along the first scanning dimension 308 to a path (e.g., a substantially straight line or an arc) at an exit pupil plane 316. In some embodiments, the optical paths of the pre-relay scan region 310, the relay scan region 312, and the post-relay scan region 314 are all coplanar. In some embodiments, the laser light 218 converges to an intermediate image plane 318 located between the first lens 304 and the second lens 306.

The second scan mirror 208 of FIG. 2 omitted from the side view 300 of FIG. 3 in order to better illustrate the convergence of the post-relay scan region 314 to a path (e.g., a substantially straight line or an arc) at the exit pupil plane 316 but is reintroduced in the side view 400 of FIG. 4. As shown in the side view 400, the second scan mirror 208 of the is interposed in the post-relay scan region 314, such that the laser light 218 output by the second lens 306 is incident upon a reflective surface 402 of the second scan mirror 208. The second scan mirror 208 scans the laser light 218 along a second scanning dimension that is substantially orthogonal to the first scanning dimension 308, such that the light 218 follows an optical path along a post-mirror scan region 404, depicted here as coming out of the page, and converging to a substantially one-dimensional path at the incoupler 212. Herein, the terms "substantially orthogonal" and "substantially perpendicular" refer to a line, plane, dimension, or axis that intersects another line, plane, dimension, or axis at an angle of between about 70 to about 110 degrees. In some embodiments, the substantially one-dimensional path corresponds to an exit pupil plane that is coincident with the incoupler 212. While the present example shows only first and second lenses 304, 306, it should be understood that, according to various other embodiments, one or more additional lenses may be interposed between the first and second lenses 304, 306.

Figure 5:
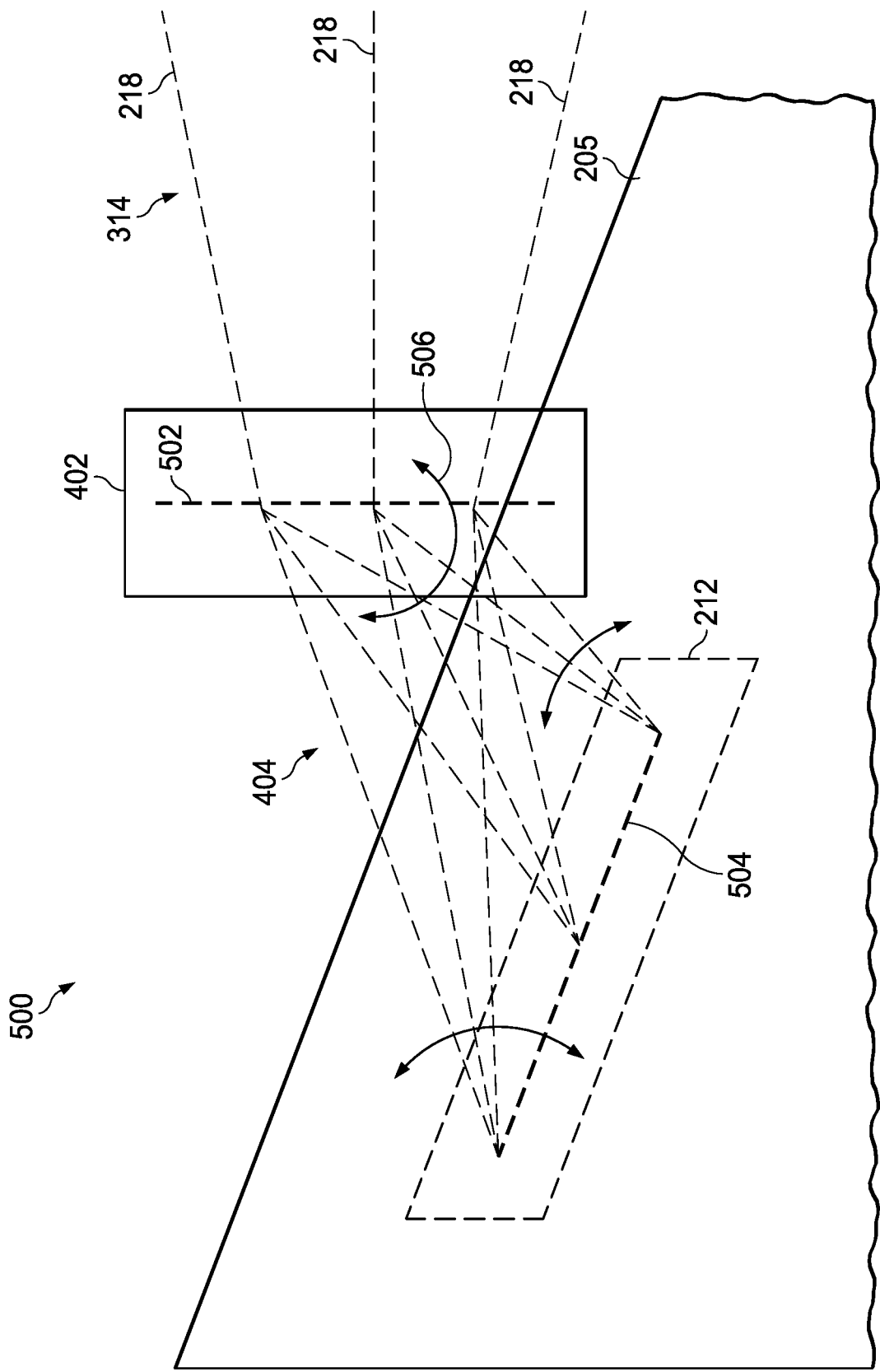
FIG. 5 is a diagram illustrating an isometric view of a portion of an optical scanner, depicting how laser light is scanned across an incoupler of a waveguide, in accordance with some embodiments.

FIG. 5 shows an isometric view 500 illustrating the reflection of the laser light 218 off the post-mirror scan region 404 and onto the incoupler 212 of the waveguide 205. As shown, the laser light 218 strikes the reflective surface 402 of the second scan mirror 208 along a line 502. In some embodiments, the line 502 is a substantially straight line. The reflective surface 402 moves (e.g., oscillates) to scan the laser light 218 over a second scanning dimension 506 across the incoupler 212 along a path 504. In some embodiments, the path 504 is a linear path, such as a straight or substantially straight line. In some embodiments, the path 504 is a non-linear path, such as an arc. In some embodiments, the line 502 is aligned along a first dimension, while the path 504 is aligned along a second dimension that is orthogonal (or substantially orthogonal) to the first dimension. The scanned laser light 218 converges onto the path 504, such that the scanned laser light 218 strikes each point along the path 504 from a plurality of different angles of incidence that are respectively offset with respect to one another along a dimension (e.g., plane) that is substantially orthogonal to the dimension along which the path 504 extends. The convergence of the optical paths of the post-mirror scan region 404 to the path 504 is caused by the relaying of the laser light 218 by the optical relay 210 (e.g., by the second lens 306) prior to the laser light 218 being scanned by the second scan mirror 208. Herein, the laser light 218 is sometimes referred to as "relayed laser light 218" after it is relayed (e.g., by reflection, refraction, or both) by one or more optical components of the optical relay 210. In some implementations, double-bounce losses may only occur along the direction of light propagation through the waveguide 205. Accordingly, in a direction that is substantially orthogonal to the direction of light propagation through the waveguide 205 (i.e., "the orthogonal direction"), the size of the incoupler 212 has little or no effect on the occurrence of double-bounce losses. Therefore, in accordance with some embodiments, the incoupler 212 is shaped to be narrow along a first dimension that is substantially orthogonal to the direction of light propagation through the waveguide and longer in a second dimension that is orthogonal or substantially orthogonal to the first dimension (e.g., a narrow rectangle), and the input light can be scanned along the path 504 at the incoupler 212. Generally, the size of the incoupler 212 along the first dimension is inversely related to the likelihood of double bounce losses occurring at the incoupler 212, such that by reducing the size of the incoupler 212 along the first dimension, the likelihood of double bounce losses is also reduced.

As shown, the laser light 218 may be incident upon a given location along the incoupler 212 from various angles, with the angle of incidence of a given beam of laser light 218 on the incoupler 212 depending on the angle at which the laser light 218 was reflected by the first scan mirror 206. In some embodiments, the incoupler 212 is a long narrow rectangle, with the narrow dimension (i.e., width) of the incoupler 212 being significantly shorter than the long dimension (i.e., length) of the incoupler 212. In some embodiments, the ratio of the long dimension to that of the narrow dimension is about 3:1 to about 3:2. In some embodiments, the ratio of the long dimension to that of the narrow dimension is at least 1.33 to 1. In some embodiments, at least one edge of the incoupler 212 (e.g., the edge along which the laser light 218 is scanned by the second scan mirror 208) is curved toward or away from the center of the incoupler 212, depending on the angle of incidence of the central ray of the laser light 218 (herein, the laser light 218 is sometimes referred to as "scanned laser light 218" after it is scanned by the second scan mirror 208), to accommodate the laser light 218 as it is scanned along a curved path, as described in more detail below in connection with FIGS. 29-32.

The incoupler 212 includes a one-dimensional diffraction grating, which may be reflective or transmissive and which may be a surface relief diffraction grating or a holographic diffraction grating. The surface of the waveguide 205 on which the incoupler 212 is disposed is dependent on whether the incoupler 212 includes a reflective or transmissive diffraction grating. For example, if the incoupler 212 includes a transmissive diffraction grating, the incoupler 212 is positioned on a first surface of the waveguide 205 that is closest to the second scan mirror 208. For example, if the incoupler 212 includes a reflective diffraction grating, the incoupler 212 is positioned at a second surface of the waveguide 205 that is opposite the first surface, such that received light passes into the waveguide 205 before being incident on the incoupler 212. In some embodiments, the waveguide 205 includes two layers that are bonded together, and the incoupler 212 is a reflective or transmissive diffraction grating disposed at an interface between the two layers of the waveguide 205. An example of how the incoupler 212 routes light through the waveguide 205 is provided below in connection with FIG. 23.

Figure 6:
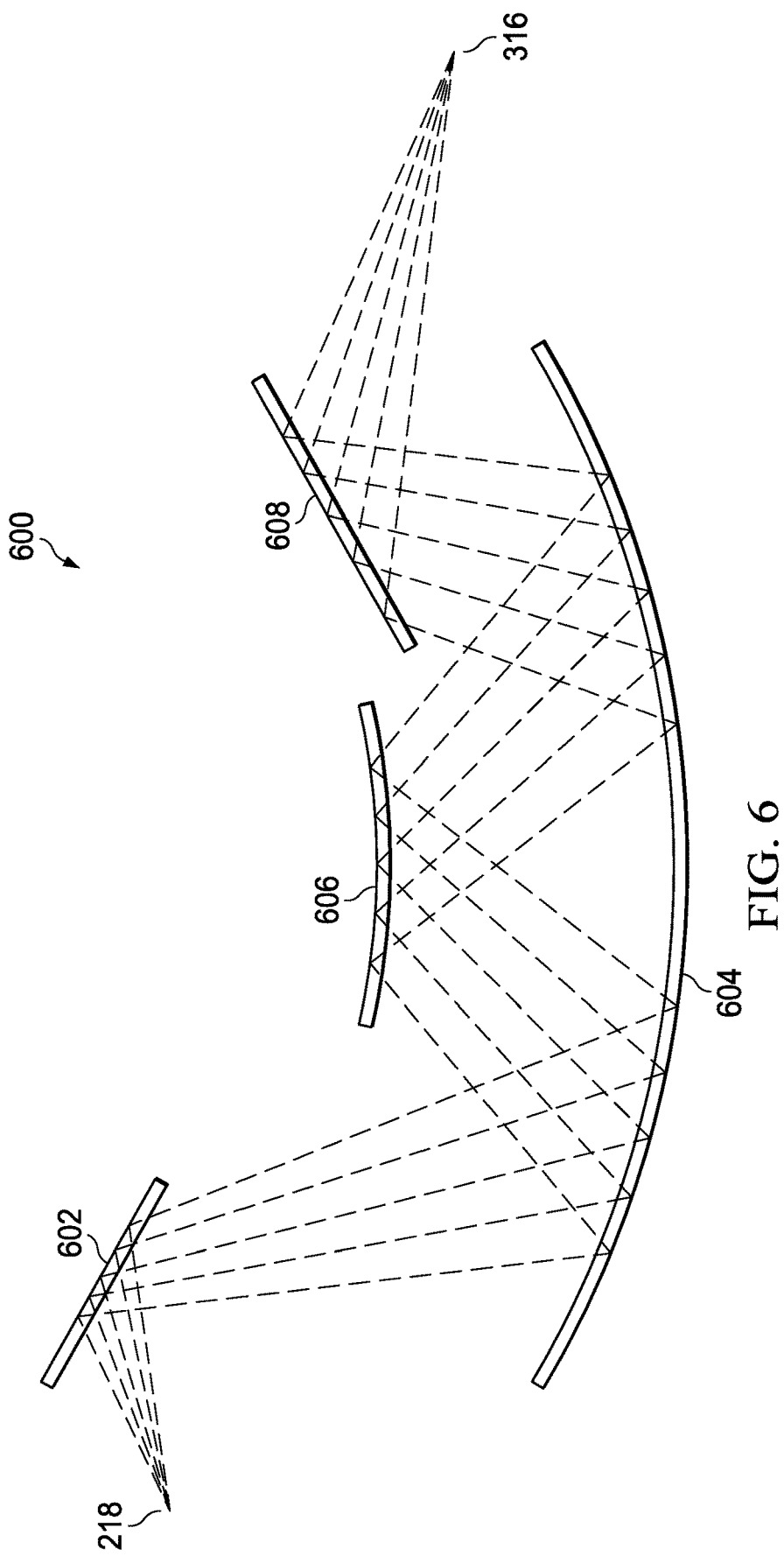
FIG. 6 is a diagram illustrating reflective surfaces of an Offner-style relay and illustrative optical paths within the Offner-style relay, in accordance with some embodiments.

While the optical relay 210 is shown to include discrete first and second lenses 304 and 306 in the example of FIGS. 3 and 4, in other embodiments different arrangements of optical elements are included in the optical relay 210. For example, FIG. 6 shows an example of optical surfaces of an Offner-style relay 600 that may be included in the optical relay 210 and illustrates the optical paths of scanned laser light 218 as it traverses the Offner-style relay 600. The Offner-style relay 600 includes a first fold mirror 602, a first spherical mirror 604, a second spherical mirror 606, and a second fold mirror 608. Herein, a "spherical mirror" refers to a mirror having a reflective surface that forms a portion of a sphere (e.g., as though the shape of the spherical mirror were cut from a sphere).

The traditional Offner relay uses two concentric reflective spherical surfaces (i.e., mirrors) to form the optical relay. Incoming light received through an input of the Offner relay is reflected off a proximal portion of the larger of the mirrors, toward the smaller of the mirrors. The smaller mirror then reflects the light toward a distal portion of the larger mirror. The distal portion of the larger mirror then reflects the light toward an output of the Offner relay. The Offner-style relay 600 of the present example is similar to a traditional Offner relay in that it includes the first and second spherical mirrors 604 and 606, which are in a concentric arrangement, but differs from the traditional Offner relay at least in that it includes first and second fold mirrors 602 and 608. Incoming laser light 218 is reflected by the first fold mirror 602 toward a first portion of the first spherical mirror 604, which reflects the laser light 218 toward the second spherical mirror 606, which reflects the laser light 218 toward a second portion of the first spherical mirror 604, which reflects the laser light 218 toward the second fold mirror 608, which reflects the laser light 218 out of the Offner-style relay 600. The curvature of the first spherical mirror 604 causes the scanned laser light 218 to converge to a path (e.g., a linear path such as a substantially straight line or a non-linear path such as an arc) at the exit pupil plane 316 upon reflection by the second portion of the first spherical mirror 604. In some embodiments, the laser light 218 converges to an image plane at the second spherical mirror 606.

In accordance with some embodiments, the mirrors 602, 604, 606, and 608 of the Offner-style relay 600 are first molded into a solid clear component (e.g., glass or an optical plastic such as Zeonex), such as a monolithic molded structure, and are then mirror coated or fabricated into a reflective metasurface. In some embodiments, one or more reflective surfaces of the Offner-style relay 600 reflect light via TIR and therefore do not require mirror coatings or fabricated metasurfaces to reflect light. Such molding may simplify the system (an embodiment of the laser projection system 200 of FIG. 2) that includes the Offner-style relay 600, as it may enable most optical surfaces of the relay to be incorporated into a single element, rather than several distinct, separate elements. Further, in some embodiments, the use of a molded structure allows for light to be propagated through one or more regions of the Offner-style relay 600 via TIR, rather using mirror coatings to propagate light through those regions.

Figure 7:
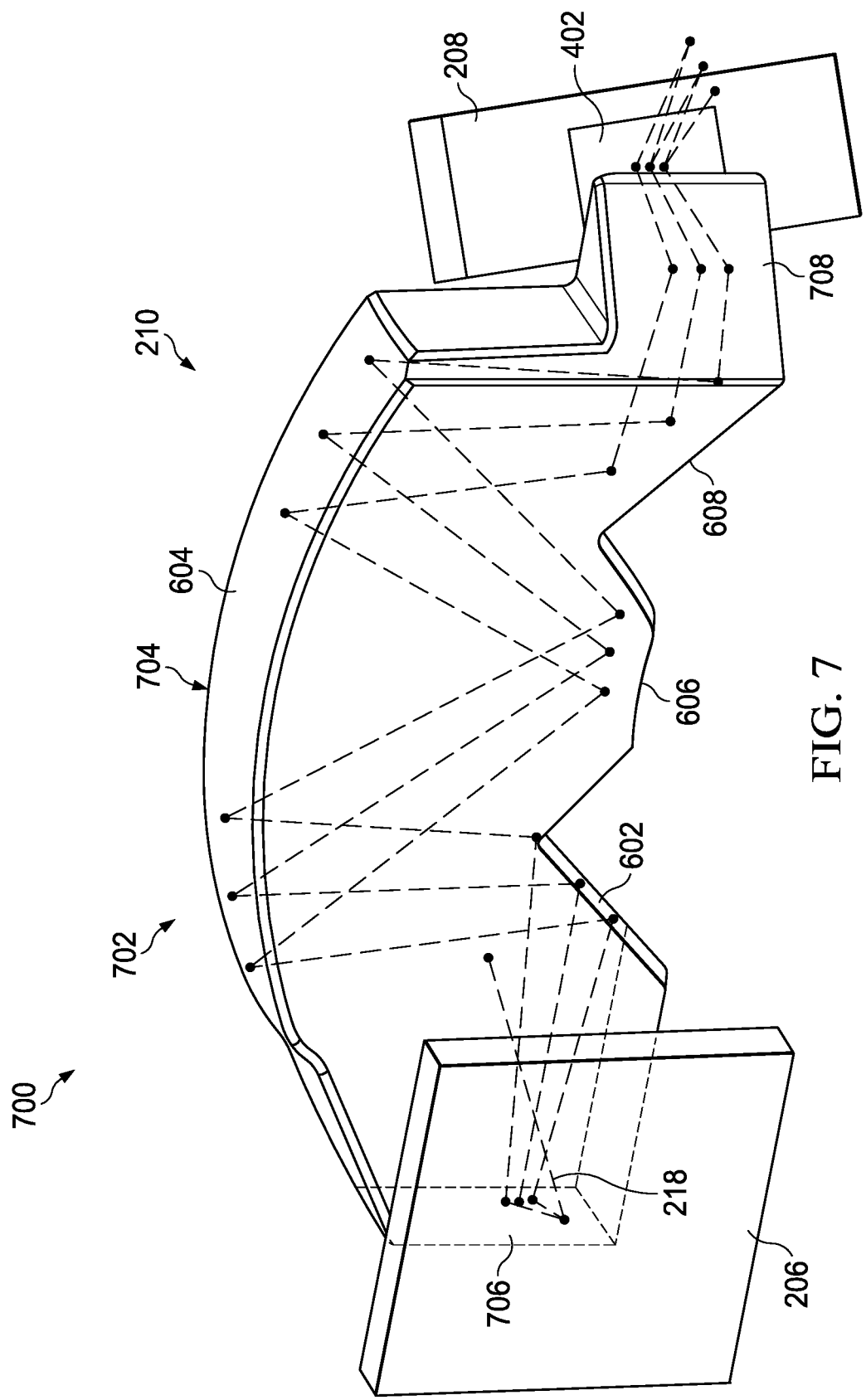
FIG. 7 is a diagram illustrating an isometric view of an optical scanner having a molded Offner-style relay disposed between two scan mirrors, in accordance with some embodiments.
Figure 8:
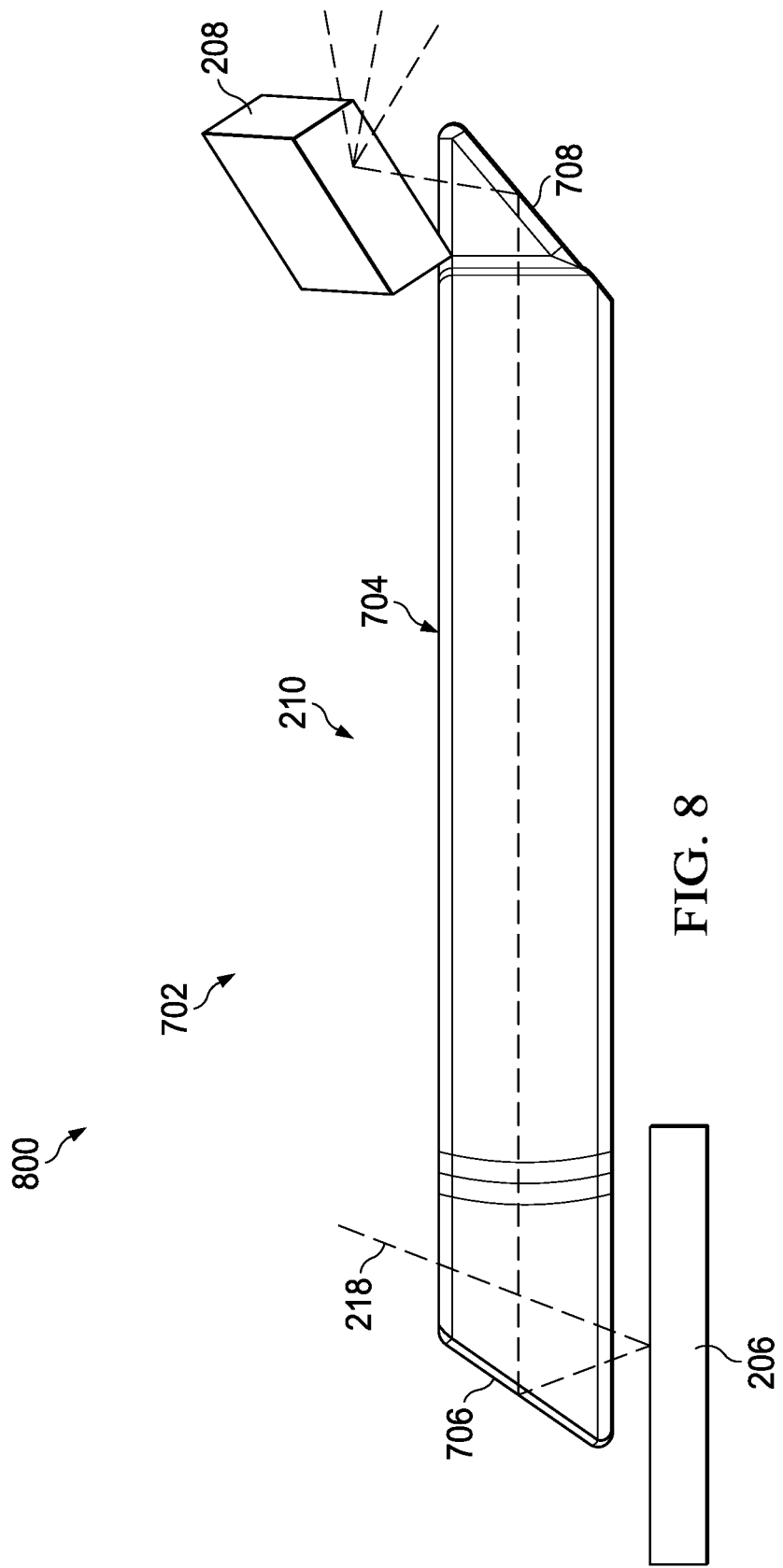
FIG. 8 is a diagram illustrating a top view of the optical scanner of FIG. 7, in accordance with some embodiments.

FIGS. 7 and 8 show an isometric view 700 and a top-down view 800, respectively, of an optical scanner 702 (one embodiment of optical scanner 204 of FIG. 2) having an optical relay 210 that includes a molded Offner-style relay 704 (e.g., a monolithic molded structure). As shown in the isometric view 700 of FIG. 7, the molded Offner-style relay 704 includes first and second fold mirrors 602 and 608 and first and second spherical mirrors 604 and 606, corresponding to those of the Offner-style relay 600 of FIG. 6. The molded Offner-style relay 704 includes additional reflective surfaces 706 and 708, such that laser light 218 is reflected by the first scan mirror 206 toward the reflective surface 706, which reflects the laser light 218 toward the fold mirror 602, which reflects the laser light 218 toward the first portion of the first spherical mirror 604, which reflects the laser light 218 toward the second spherical mirror 606, which reflects the laser light 218 toward the second portion of the first spherical mirror 604, which reflects the laser light 218 toward the second fold mirror 608, which reflects the laser light 218 toward the reflective surface 708, which reflects the laser light 218 out of the molded Offner-style relay 704 toward the reflective surface 402 of the second scan mirror 208. In some embodiments, the laser light 218 converges to an image plane at the second spherical mirror 606. In some embodiments, the first scan mirror 206 is coincident with an entrance pupil plane of the Offner-style relay 704. In some embodiments, the mirrors 602, 604, 606, and 608 and the reflective surfaces 706 and 708 are first molded into a solid clear component (e.g., glass or an optical plastic such as Zeonex), such as a monolithic molded structure, and are then mirror coated or fabricated into a reflective metasurface. In some embodiments, one or more reflective surfaces of the Offner-style relay 704 reflect light via TIR and therefore do not require mirror coatings or fabricated metasurfaces to reflect light. Such molding may simplify the system (an embodiment of the laser projection system 200 of FIG. 2) that includes the optical scanner 702 as it may enable most optical surfaces of the relay to be incorporated into a single element, rather than several distinct, separate elements. Further, the use of a molded structure can allow for light propagation through the molded Offner-style relay 704 via TIR, rather than mirror coatings.

As shown in the top-down view 800 of FIG. 8, in some embodiments the laser light 218 propagates toward the first scan mirror 206 through the molded Offner-style relay 704 without being diffracted, reflected, or otherwise distorted, as the portions of the Offner-style relay 704 that are not designated as reflective surfaces are optically clear. In other embodiments, one or more surfaces of the molded Offner-style relay 704 that the laser light 218 propagates through when traveling toward the first scan mirror 206 include one or more optical functions (e.g., optical functions that reshape the beam profile of the laser light 218) or apertures. The top-down view 800 illustrates how the laser light 218 propagates along a first dimension (i.e., length) of the molded Offner-style relay 704 between the reflective surface 706 and the reflective surface 708. In some embodiments, the laser light 218 propagates along the first dimension without deviation along the second dimension (i.e., width) of the molded Offner-style relay 704 regardless of the scan angle of the first scan mirror 206 at the time the laser light 218 is incident on the first scan mirror 206. That is, the fold mirrors 602 and 608 and the spherical mirrors 604 and 606 of the Offner-style relay 704 are configured to relay the laser light 218 along a plane that is aligned with the long dimension of the Offner-style relay 704 and a third dimension (i.e., height) of the Offner-style relay 704. As shown in the isometric view 700, the optical path of the laser light 218 changes direction along the third dimension at each reflective surface of the Offner-style relay 704.

Figure 9:
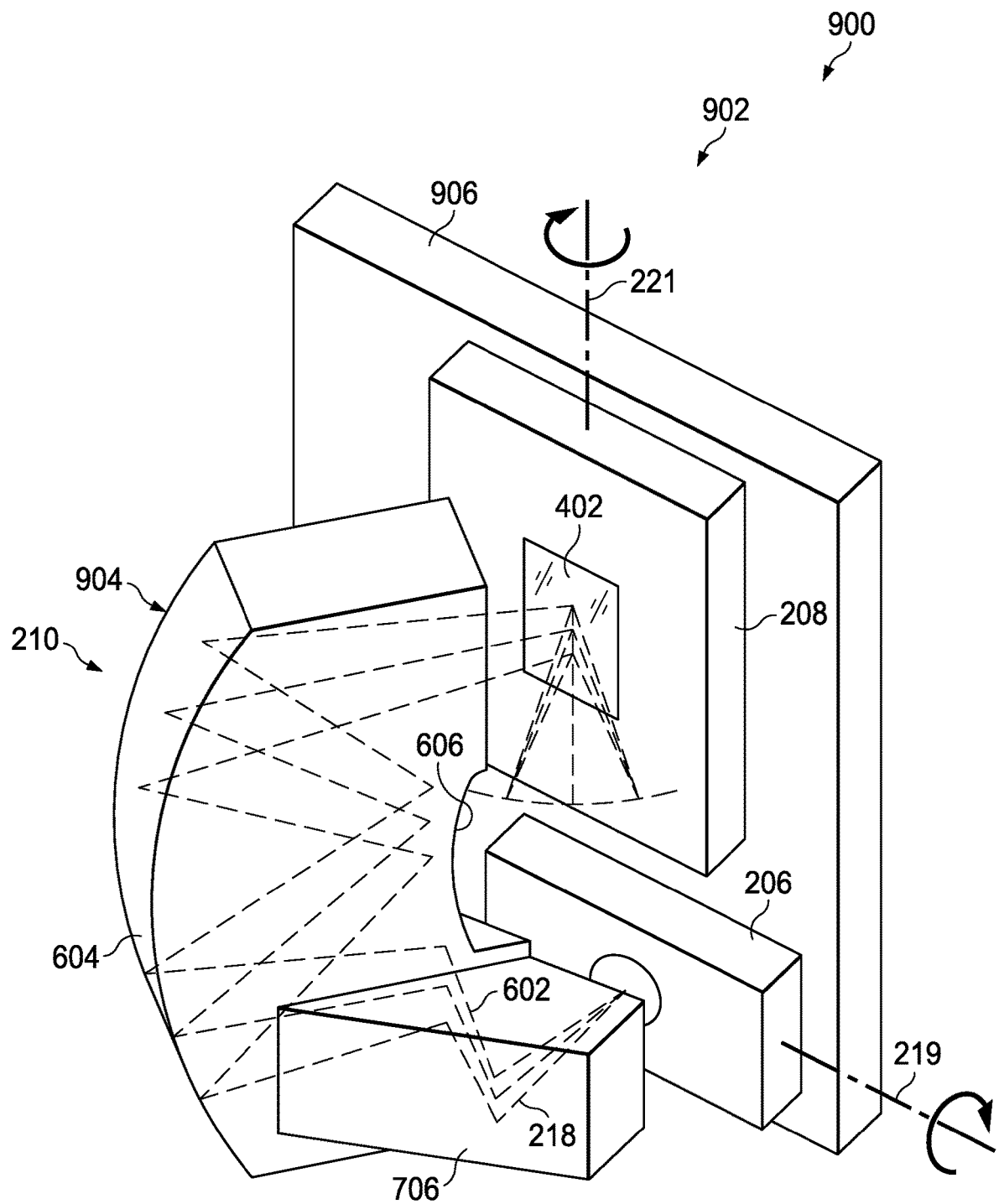
FIG. 9 is a diagram illustrating an isometric view of an optical scanner having an Offner-style relay disposed between two scan mirrors that are disposed in-plane with one another on a common substrate, in accordance with some embodiments.
Figure 10:
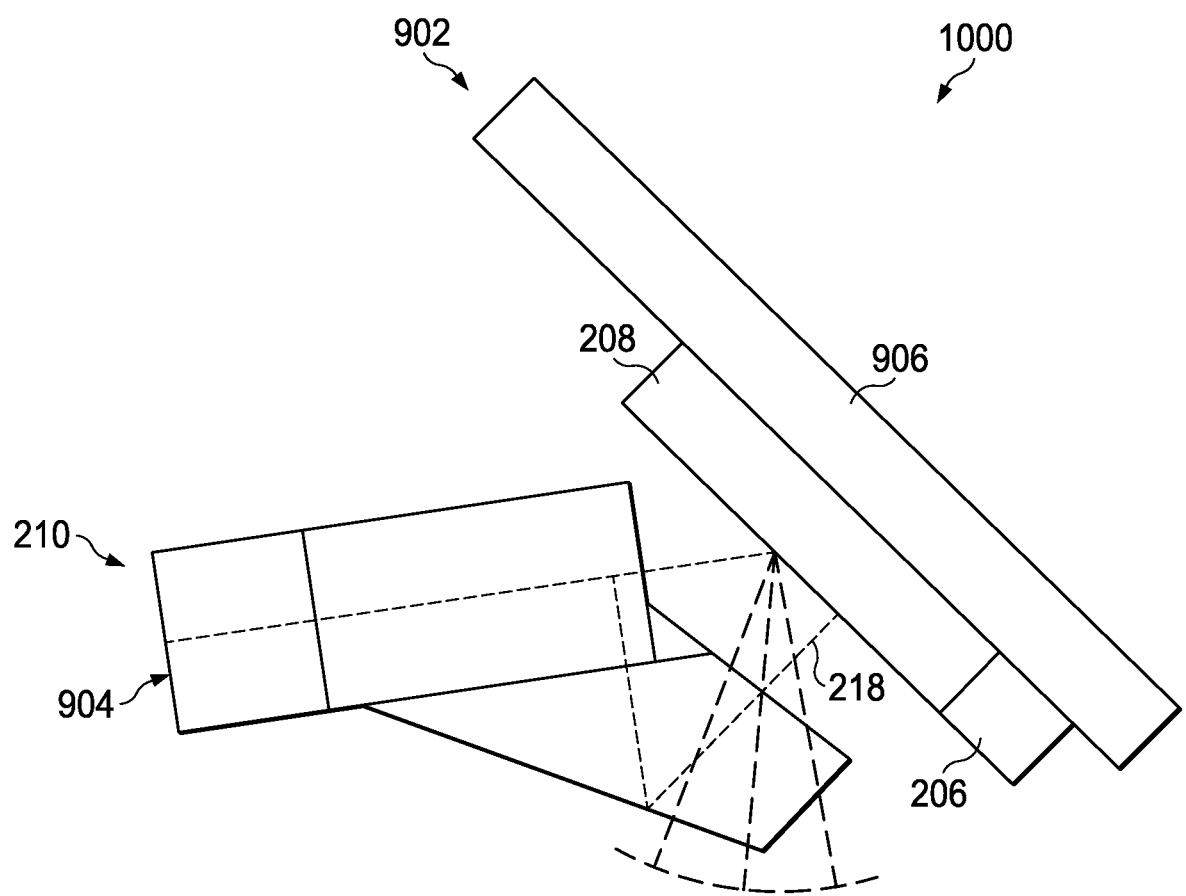
FIG. 10 is a diagram illustrating a top view of the optical scanner of FIG. 9, in accordance with some embodiments.

FIGS. 9 and 10 show an isometric view 900 and a top-down view 1000, respectively, of an optical scanner 902 (one embodiment of optical scanner 204 of FIG. 2) having an optical relay 210 that includes a molded Offner-style relay 904 (e.g., a monolithic molded structure). In the example of the optical scanner 902, the first and second scan mirrors 206 and 208 are disposed on a common surface of a substrate 906, such that the first scan mirror 206 is substantially coplanar with respect to the second scan mirror 208. Such an arrangement of the first and second scan mirrors 206 and 208 reduces the volume or form factor of the optical scanner 902 compared to arrangements in which the first and second scan mirrors 206 and 208 are disposed on different substrates and reduces the complexity of electrical connections between the first and second scan mirrors 206 and 208 and associated controllers and power supplies (not shown).

As shown in the isometric view 900 of FIG. 9, the molded Offner-style relay 904 includes a fold mirror 602 and first and second spherical mirrors 604 and 606, corresponding to those of the Offner-style relay 600 of FIG. 6. The molded Offner-style relay 904 includes an additional reflective surface 706. Compared to the molded Offner-style relay 704 of FIGS. 7 and 8, the molded Offner-style relay 904 omits the reflective surface 708 and the second fold mirror 608. As previously described, the first scan mirror 206 rotates about a first axis 219 and the second scan mirror 208 rotates about a second axis 221. In the present example, the first axis 219 is substantially orthogonal to the second axis 221. The laser light 218 is reflected by the first scan mirror 206 toward the reflective surface 706, which reflects the laser light 218 toward the fold mirror 602, which reflects the laser light 218 toward the first portion of the first spherical mirror 604, which reflects the laser light 218 toward the second spherical mirror 606, which reflects the laser light 218 toward the second portion of the first spherical mirror 604, which reflects the laser light 218 out of the molded Offner-style relay 904 toward the reflective surface 402 of the second scan mirror 208. In some embodiments, the laser light 218 converges to an image plane at the second spherical mirror 606. In some embodiments, an entrance pupil plane of the molded Offner-style relay 904 is coincident with the first scan mirror 206. In some embodiments, the laser light 218 converges to an exit pupil plane that is coincident with an incoupler of a waveguide (e.g., the incoupler 212 of the waveguide 205 of FIG. 2).

In some embodiments, the mirrors 602, 604, 606, and the reflective surface 706, are first molded into a solid clear component (e.g., glass or an optical plastic such as Zeonex), such as a monolithic molded structure, and are then mirror coated or fabricated into a reflective metasurface. In some embodiments, one or more reflective surfaces of the molded Offner-style relay 904 reflect light via TIR and therefore do not require mirror coatings or fabricated metasurfaces to reflect light. Such molding may simplify the system (e.g., the laser projection system 200 of FIG. 2) that includes the optical scanner 902 as it may enable most optical surfaces of the relay to be incorporated into a single element, rather than several distinct, separate elements. Further, in some embodiments, the use of a molded structure allows for light to be propagated through one or more regions of the molded Offner-style relay 904 via TIR, rather using mirror coatings to propagate light through those regions.

As illustrated by the combination of the isometric view 900 and the top-down view 1000, the laser light 218 propagates along a first dimension (i.e., length) of the molded Offner-style relay 904 between the first fold mirror 602 and the second portion of the first spherical mirror 604. In some embodiments, the laser light 218 propagates along the first dimension without deviation along the second dimension (i.e., width) of the molded Offner-style relay 904, regardless of the scan angle of the first scan mirror 206 at the time the laser light 218 is incident on the first scan mirror 206. That is, the fold mirror 602 and the spherical mirrors 604 and 606 of the molded Offner-style relay 904 are configured to relay the laser light 218 along a plane that is aligned with the long dimension of the molded Offner-style relay 904 and with a third dimension (i.e., height) of the molded Offner-style relay 904. As shown in the isometric view 900, the optical path of the laser light 218 changes direction along the third dimension at each of the fold mirror 602, the first spherical mirror 604, and the second spherical mirror 606 of the molded Offner-style relay 904.

Figure 11:
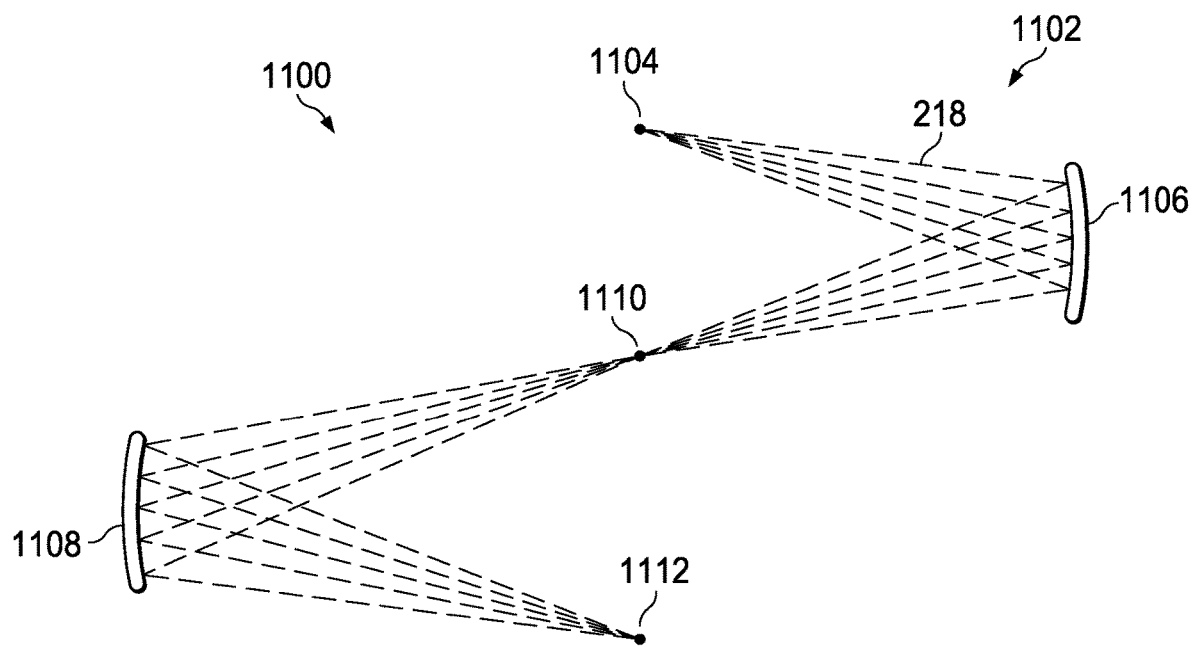
FIG. 11 is a diagram illustrating reflective surfaces of a reflective relay and illustrative optical paths within the reflective relay, in accordance with some embodiments.
Figure 12:
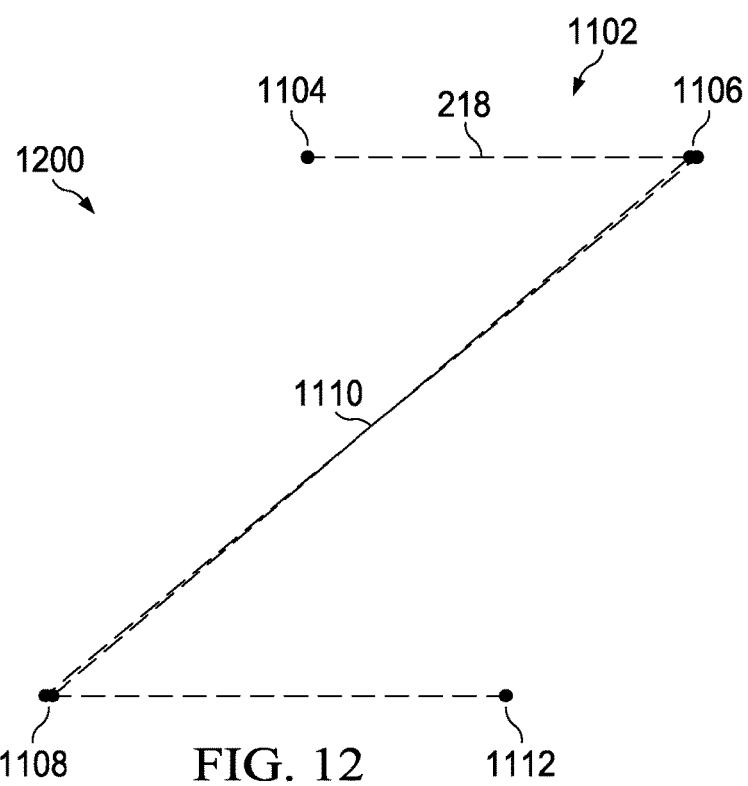
FIG. 12 is a diagram illustrating a top view of the optical paths within the reflective relay of FIG. 11, in accordance with some embodiments.

FIGS. 11 and 12 show an isometric view 1100 and a top-down view 1200, respectively, of optical surfaces of a molded reflective relay 1102 (e.g., a monolithic molded structure) that may be included in an optical relay, such as the optical relay 210 of the laser projection system 200, and illustrate the optical paths of scanned laser light 218 as it traverses the molded reflective relay 1102. The molded reflective relay 1102 includes a first curved mirror 1106 and a second curved mirror 1108. As shown, laser light 218 is scanned into the molded reflective relay 1102 from a point 1104 (e.g., an entrance pupil plane coincident with the reflective surface of the first scan mirror 206 of FIG. 2). The laser light 218 is then reflected off the first curved mirror 1106 toward the second curved mirror 1108, which reflects the laser light 218 out of the molded reflective relay 1102. The curvature of the first curved mirror 1106 causes the relay scan region of the scanned laser light 218 to converge to an intermediate image plane 1110 disposed in the optical path between the first curved mirror 1106 and the second curved mirror 1108. Herein, an "intermediate image plane" refers to a plane within an optical system (e.g., an optical relay such as the molded reflective relay 1102) at which an image is formed (e.g., due to convergence of the scanned laser light 218) prior to the final focal plane of the optical system. Because the intermediate image plane 1110 is not located at a surface of the molded reflective relay 1102, reductions in optical quality that can be caused by dust or imperfections at such a surface are reduced or avoided. Following the intermediate image plane 1110, the relay scan region of the scanned laser light 218 expands as it approaches the second curved mirror 1108. The curvature of the second curved mirror 1108 causes the laser light 218 to converge to an exit pupil plane 1112 (e.g., coincident with the incoupler 212). For some embodiments in which the molded reflective relay 1102 is included in the laser projection system 200 of FIG. 2 or another similar system, the second scan mirror 208 is disposed in the optical path following the second curved mirror 1108 and scans the laser light 218 across the incoupler 212 of the waveguide 205.

In some embodiments, the first and second curved mirrors 1106 and 1108 are first molded into a solid clear component (e.g., glass or an optical plastic such as Zeonex), such as a monolithic molded structure, and are then mirror coated or fabricated into a reflective metasurface. In some embodiments, one or more reflective surfaces of the molded reflective relay 1102 reflect light via TIR and therefore do not require mirror coatings or fabricated metasurfaces to reflect light. Such molding may simplify the system (e.g., the laser projection system 200 of FIG. 2) that includes the molded reflective relay 1102 as it may enable most optical surfaces of the relay to be incorporated into a single element, rather than several distinct, separate elements. Further, in some embodiments, the use of a molded structure allows for light to be propagated through one or more regions of the molded reflective relay 1102 via TIR, rather using mirror coatings to propagate light through those regions.

As illustrated by the combination of the isometric view 1100 and the top-down view 1200, the laser light 218 propagates along a first dimension (i.e., length) of the molded reflective relay 1102 between the first curved mirror 1106 and the second curved mirror 1108. In some embodiments, the laser light 218 propagates along the first dimension without deviation along a second dimension (i.e., width) of the molded reflective relay 1102, regardless of the scan angle of the laser light 218 input to the molded reflective relay 1102. That is, the first and second curved mirrors 1106 and 1108 of the molded reflective relay 1102 are configured to relay the laser light 218 along a plane that is aligned with the long dimension of the molded reflective relay 1102 and with a third dimension (i.e., height) of the molded reflective relay 1102.

Figures 13, 14:
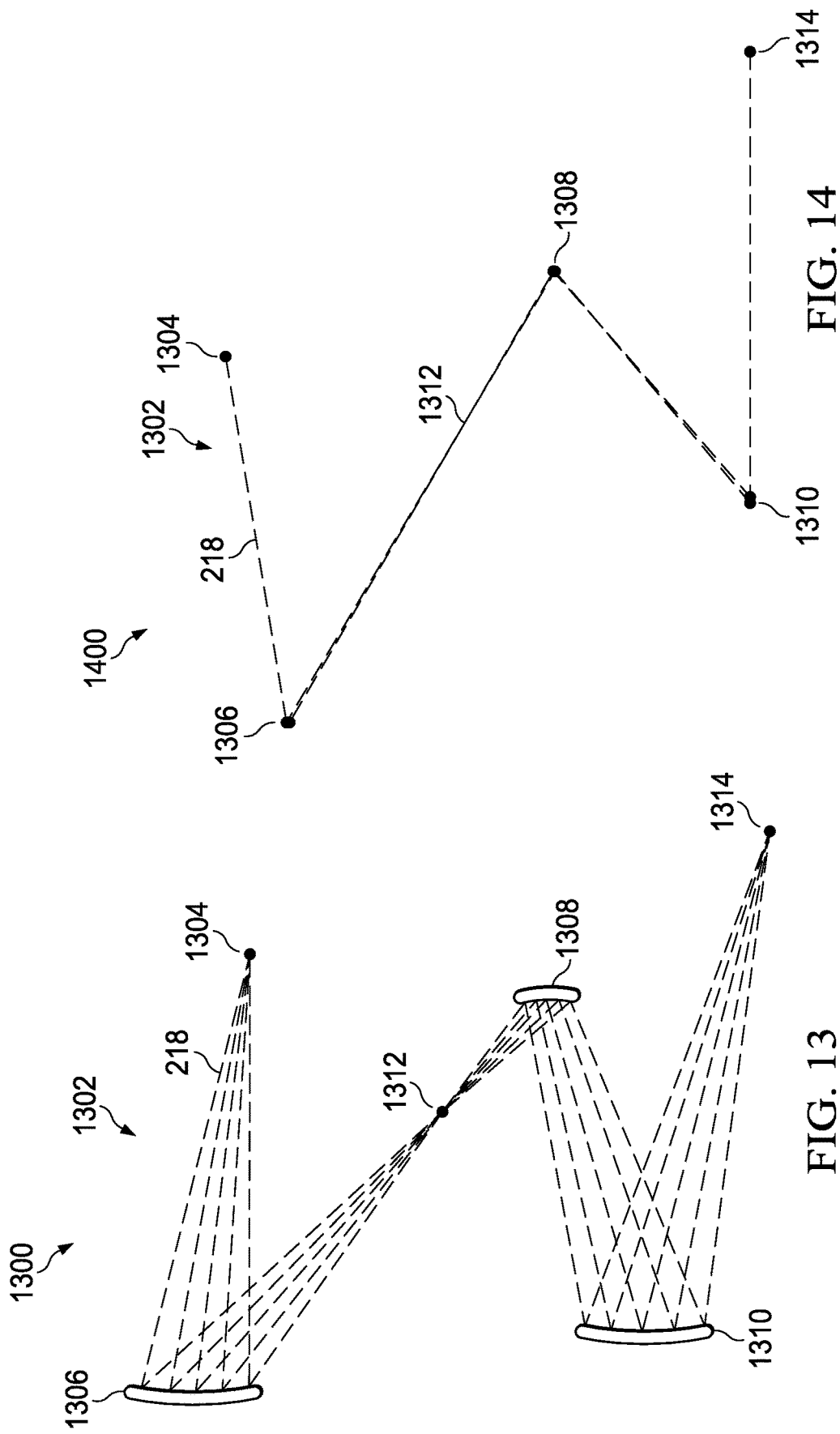
FIG. 13 is a diagram illustrating reflective surfaces of a reflective relay and illustrative optical paths within the reflective relay, where the reflective surfaces include first and second fold mirrors, in accordance with some embodiments.
FIG. 14 is a diagram illustrating a top view of the optical paths within the reflective relay of FIG. 13, in accordance with some embodiments.

FIGS. 13 and 14 show an isometric view 1300 and a top-down view 1400, respectively, of optical surfaces of a molded reflective relay 1302 (e.g., a monolithic molded structure) that may be included in an optical relay, such as the optical relay 210 of the laser projection system 200, and illustrate the optical paths of scanned laser light 218 as it traverses the molded reflective relay 1302. The molded reflective relay 1302 includes a first curved mirror 1306, a fold mirror 1308, and a second curved mirror 1310. As shown, laser light 218 is scanned into the molded reflective relay 1302 from a point 1304 (e.g., an entrance pupil plane that is coincident with the reflective surface of the first scan mirror 206 of FIG. 2). The laser light 218 is then reflected off the first curved mirror 1306 toward the fold mirror 1308, which reflects the laser light 218 toward the second curved mirror 1310, which reflects the laser light 218 out of the molded reflective relay 1302. The curvature of the first curved mirror 1306 causes the relay scan region of the scanned laser light 218 to converge to an intermediate image plane 1312 disposed in the optical path between the first curved mirror 1306 and the second curved mirror 1310. Because the intermediate image plane 1312 is not located at a surface of the molded reflective relay 1302, reductions in optical quality that can be caused by dust or imperfections at such a surface are reduced or avoided. Following the intermediate image plane 1312, the relay scan region of the scanned laser light 218 expands as it approaches the fold mirror 1308 and expands further as it approaches the second curved mirror 1310. The curvature of the second curved mirror 1310 causes the laser light 218 to converge to an exit pupil plane 1314 (e.g., coincident with the incoupler 212). For some embodiments in which the molded reflective relay 1302 is included in the laser projection system 200 of FIG. 2 or another similar system, the second scan mirror 208 is disposed in the optical path following the second curved mirror 1310 and scans the laser light 218 across the incoupler 212 of the waveguide 205. In some embodiments, the first and second curved mirrors 1306 and 1310 and the fold mirror 1308 are first molded into a solid clear component (e.g., glass or an optical plastic such as Zeonex), such as a monolithic molded structure, and are then mirror coated or fabricated into a reflective metasurface. In some embodiments, one or more reflective surfaces of the molded reflective relay 1302 reflect light via TIR and therefore do not require mirror coatings or fabricated metasurfaces to reflect light. Such molding may simplify the system (an embodiment of the laser projection system 200 of FIG. 2) that includes the molded reflective relay 1302 as it may enable most optical surfaces of the relay to be incorporated into a single element, rather than several distinct, separate elements. Further, in some embodiments, the use of a molded structure allows for light to be propagated through one or more regions of the molded reflective relay 1302 via TIR, rather using mirror coatings to propagate light through those regions.

As illustrated by the combination of the isometric view 1300 and the top-down view 1400, the laser light 218 propagates along a first plane between the first curved mirror 1306 and the fold mirror 1308, then propagates along a second plane between the fold mirror 1308 and the second curved mirror 1310.

Figure 16:
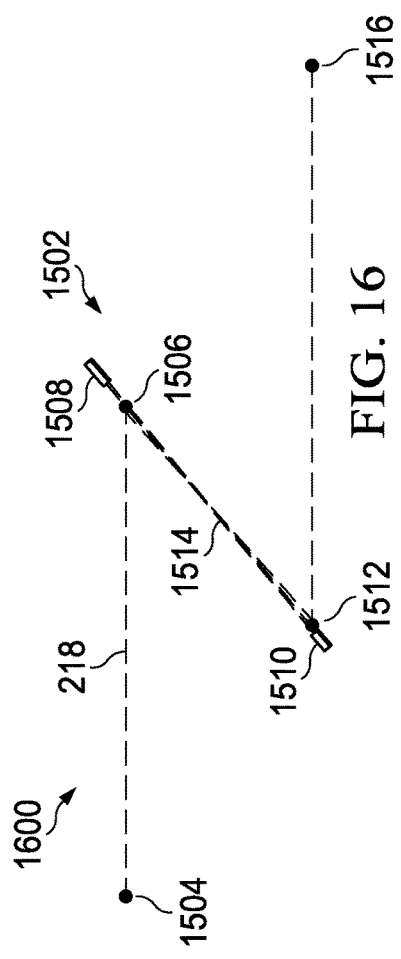
FIG. 16 is a diagram illustrating a top view of the optical paths within the reflective relay of FIG. 15, in accordance with some embodiments.
Figure 17:
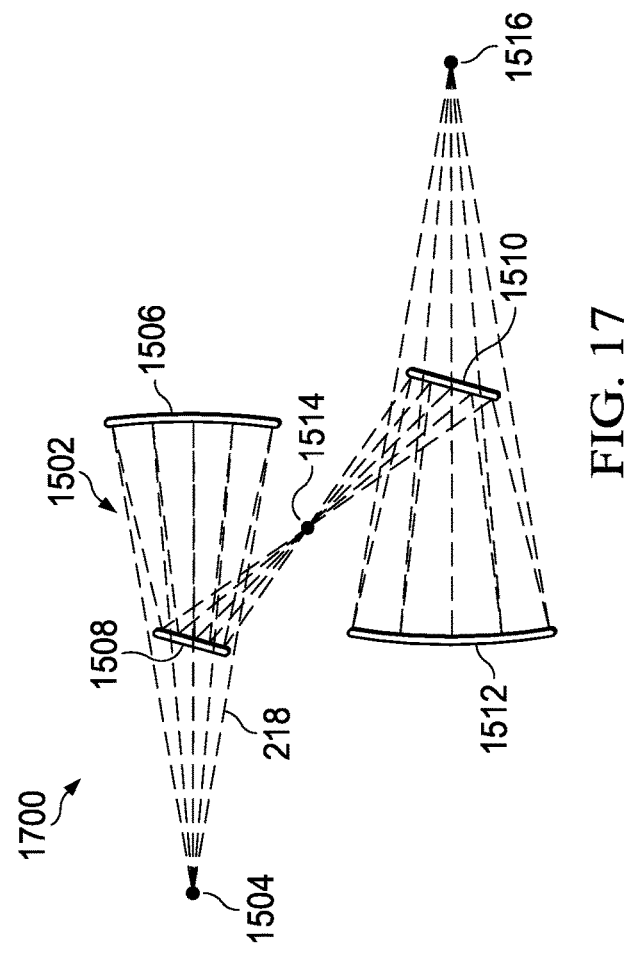
FIG. 17 is a diagram illustrating reflective surfaces of a reflective relay and illustrative optical paths within the reflective relay, where the reflective surfaces include first and second curved mirrors and first and second fold mirrors, in accordance with some embodiments.
Figure 15:
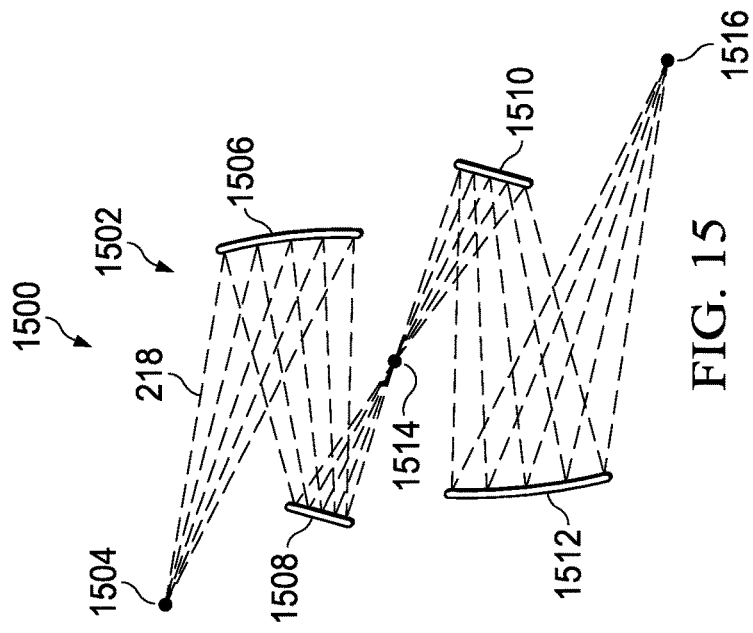
FIG. 15 is a diagram illustrating reflective surfaces of a reflective relay and illustrative optical paths within the reflective relay, where the reflective surfaces include first and second curved mirrors and a fold mirror, in accordance with some embodiments.

FIGS. 15, 16, and 17 show an isometric view 1500, a top-down view 1600, and a front view 1700, respectively, of optical surfaces of a molded reflective relay 1502 (e.g., a monolithic molded structure) that may be included in an optical relay, such as the optical relay 210 of the laser projection system 200, and illustrate the optical paths of scanned laser light 218 as it traverses the molded reflective relay 1502. The molded reflective relay 1502 includes a first curved mirror 1506, a first fold mirror 1508, a second fold mirror 1510, and a second curved mirror 1512. As shown, laser light 218 is scanned into the molded reflective relay 1502 from a point 1504 (e.g., an entrance pupil plane that is coincident with the reflective surface of the first scan mirror 206 of FIG. 2). The laser light 218 is then reflected off the first curved mirror 1506 toward the first fold mirror 1508, which reflects the laser light 218 toward the second fold mirror 1510, which reflects the laser light 218 toward the second curved mirror 1512, which reflects the laser light 218 out of the molded reflective relay 1502. The curvature of the first curved mirror 1506 causes the relay scan region of the scanned laser light 218 to converge to an intermediate image plane 1514 disposed in the optical path between the first fold mirror 1508 and the second fold mirror 1510. Because the intermediate image plane 1514 is not located at a surface of the molded reflective relay 1502, reductions in optical quality that can be caused by dust or imperfections at such a surface are reduced or avoided. Following the intermediate image plane 1514, the relay scan region of the scanned laser light 218 expands as it approaches the second fold mirror 1510 and expands further after reflection at the second fold mirror 1510 as it approaches the second curved mirror 1512. The curvature of the second curved mirror 1512 causes the laser light 218 to converge to an exit pupil plane 1516 (e.g., coincident with the incoupler 212). For some embodiments in which the molded reflective relay 1502 is included in the laser projection system 200 of FIG. 2 or another similar system, the second scan mirror 208 is disposed in the optical path following the second curved mirror 1512 and scans the laser light 218 across the incoupler 212 of the waveguide 205.

In some embodiments, the first and second curved mirrors 1506 and 1512 and the first and second fold mirrors 1508 and 1510 are first molded into a solid clear component (e.g., glass or an optical plastic such as Zeonex), such as a monolithic molded structure, and are then mirror coated. In some embodiments, one or more reflective surfaces of the molded reflective relay 1502 reflect light via TIR and therefore do not require mirror coatings or fabricated metasurfaces to reflect light. Such molding may simplify the system (an embodiment of the laser projection system 200 of FIG. 2) that includes the molded reflective relay 1502 as it may enable most optical surfaces of the relay to be incorporated into a single element, rather than several distinct, separate elements. Further, in some embodiments, the use of a molded structure allows for light to be propagated through one or more regions of the molded reflective relay 1502 via TIR, rather using mirror coatings to propagate light through those regions.

As illustrated by the combination of the isometric view 1500, the top-down view 1600, and the front view 1700, the laser light 218 propagates along a first dimension (i.e., length) of the molded reflective relay 1502 between the first curved mirror 1506 and the second curved mirror 1512. In some embodiments, the laser light 218 propagates along the first dimension without deviation along the second dimension (i.e., width) of the molded reflective relay 1502, regardless of the scan angle of the laser light 218 input to the molded reflective relay 1502. That is, the first and second curved mirrors 1506 and 1512 and the first and second fold mirrors 1508 and 1510 of the molded reflective relay 1502 are configured to relay the laser light 218 along a plane that is aligned with the long dimension of the molded reflective relay 1502 and with a third dimension (i.e., height) of the molded reflective relay 1502. As shown in the isometric view 1500 and the front view 1700, the optical path of the laser light 218 changes direction along the third dimension at each of the first and second fold mirrors 1508 and 1510 of the molded reflective relay 1502.

The molded reflective relays 1102, 1302, and 1502 of FIGS. 11-17 differ from Offner relays and Offner-style relays in various ways. For example, a traditional Offner relay includes two concentric or substantially concentric spherical mirrors, and the size (i.e., "pupil size") of the entrance or exit pupil plane (e.g., size of the virtual aperture represented thereby) is typically very small relative to the total size of a typical optical system in which a traditional Offner relay is used. For applications in which the total system size is comparatively small (e.g., some embodiments of the laser projection system 200 of FIG. 2) and the pupil size is comparatively large relative to the total system size, the optical quality provided by a traditional Offner relay is comparatively reduced. In contrast, the reflective surfaces of any of the molded reflective relays 1102, 1302, or 1502 are not limited to being spherical (e.g., the reflective surfaces can be aspherical, parabolic, cylindrical, acylindrical, elliptical, parabolic, or freeform), and therefore have the flexibility to achieve better optical performance for systems in which the pupil size is comparatively large relative to the total system size. Additionally, conventional Offner relays and Offner-style relays are symmetric, which reduces the flexibility and increases the difficulty of system package design for systems that use such relays. In contrast, some embodiments of the molded reflective relay are asymmetric such that a first section of any of the molded reflective relays 1102, 1302, or 1502 between the point 1104, 1304, or 1504 and the first curved mirror 1106, 1306, or 1506, respectively, is shorter than a second section of the molded reflective relay 1102, 1302, or 1502 between the second curved mirror 1108, 1308, or 1512 and the intermediate image plane 1110, 1312, or 1514, respectively, or vice versa. Also, an Offner relay typically includes an intermediate image plane at one of its concentric spherical mirrors, and its performance is sensitive to any dust or tiny imperfections on this surface. In some embodiments, the geometry of any of the molded reflective relays 1102, 1302, or 1502 break the Offner symmetry requirement, and have respective intermediate image planes 1110, 1312, or 1514 located inside the molded reflective relay 1102, 1302, or 1502, away from any surface, thereby reducing or avoiding loss of quality due to surface imperfections or surface dust.

Figure 18:
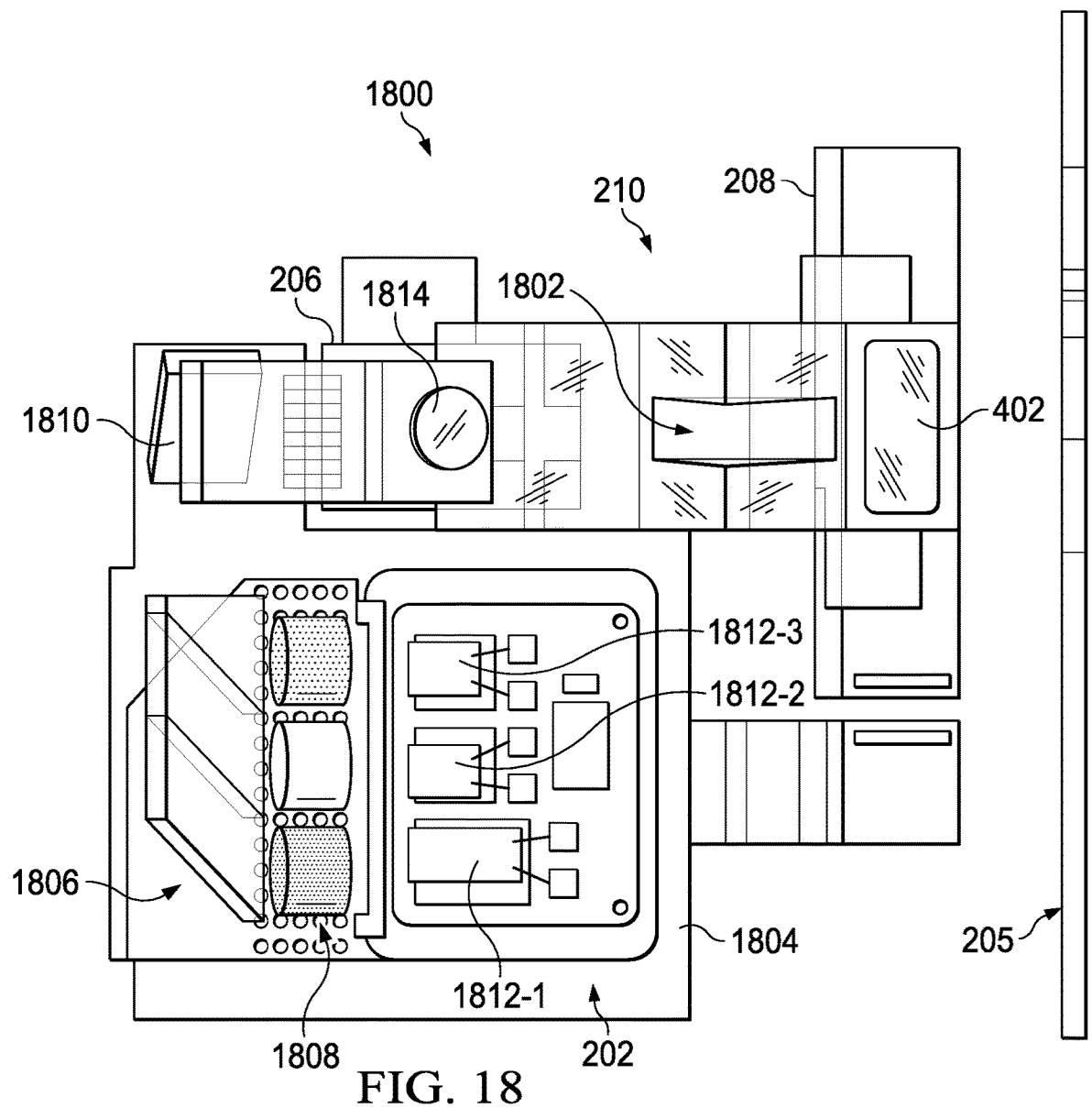
FIG. 18 is a diagram illustrating a laser projection system that includes a molded reflective relay disposed between two scan mirrors, in accordance with some embodiments.

FIG. 18 shows a laser projection system 1800, which is an example implementation of the laser projection system 200 of FIG. 2 and in which the optical relay 210 includes a molded reflective relay 1802, which may, according to various embodiments, correspond to one of the molded reflective relays 1102, 1302, and 1502 of FIGS. 11, 13, and 15. As shown, the laser projection system 200 includes a substrate 1804 on which a beam combiner 1806, primary lenses 1808, and a mirror 1810 are disposed. According to various embodiments, the substrate 1804 is a printed circuit board (PCB) or otherwise another applicable substrate.

The optical engine 202 comprises a set of one or more laser light sources 1812 (e.g., laser diodes), such as the illustrated red laser light source 1812-1, green laser light source 1812-2, and blue laser light source 1812-3, wherein a processor or other controller operates the optical engine 202 to modulate the respective intensity of each laser light source 1812 so as to provide a corresponding red light, green light, and blue light contribution to a corresponding pixel of an image being generated for display to the user. The primary lenses 1808 include a corresponding number of collimation lenses (in some embodiments, such as the example above, three for the three laser light sources 1812), each interposed in the light path between a respective laser light source of the laser light sources 1812 and the beam combiner 1806. For example, each laser light source 1812 outputs a different wavelength of laser light (e.g., corresponding to respective red, blue, and green wavelengths) through each of the primary lenses 1808, respectively, to be combined at the beam combiner 1806 to produce the laser light (i.e., laser light 218 shown in FIG. 2) to be projected by the laser projection system 200. The beam combiner 1806 receives the individual laser light inputs, then outputs a combined laser light to the mirror 1810, which redirects the laser light onto a reflective surface 1814 of the first scan mirror 206. The first scan mirror 206 scans the laser light into the molded reflective relay 1802 of the optical relay 210 across a first scanning dimension.

In the example of FIG. 18, the optical relay 210 includes the molded reflective relay 1802. In some embodiments, the molded reflective relay 1802 is molded from a solid clear component (e.g., glass or an optical plastic such as Zeonex), such as a monolithic molded structure, and the reflective surfaces thereof are implemented as mirror coatings or are fabricated into reflective metasurfaces. In some embodiments, one or more reflective surfaces of the molded reflective relay 1802 reflect light via TIR and therefore do not require mirror coatings or fabricated metasurfaces to reflect light. Such molding can simplify the fabrication of the laser projection system 200 as it facilitates the incorporation of some or all of the optical surfaces of the relay into a single element, rather than several distinct, separate elements. Further, in some embodiments, the use of a molded structure allows for light to be propagated through one or more regions of the molded reflective relay 1802 via TIR, rather using mirror coatings to propagate light through those regions.

The optical relay 210 is configured to route the laser light toward a reflective surface 402 of the second scan mirror 208. The second scan mirror 208 scans the laser light across the incoupler (such as the incoupler 212) of the waveguide 205 along a second scanning dimension. In some embodiments, the second scanning dimension is substantially perpendicular to the plane along which the laser light propagates through the optical relay 210. In some embodiments, the laser light is incident normal to the incoupler of the waveguide 205 upon incidence at the incoupler, and the laser light is scanned along a path at the incoupler. In some embodiments, the path may be linear or substantially linear, such that the laser light is scanned along a substantially straight line at the incoupler. In some embodiments, the laser light is scanned across the incoupler of the waveguide 205, such that a central ray of the scanned laser light is non-orthogonal with respect to the plane of the incoupler, and such that the laser light is scanned along a curved line (e.g., an arc) at the incoupler.

Figure 19:
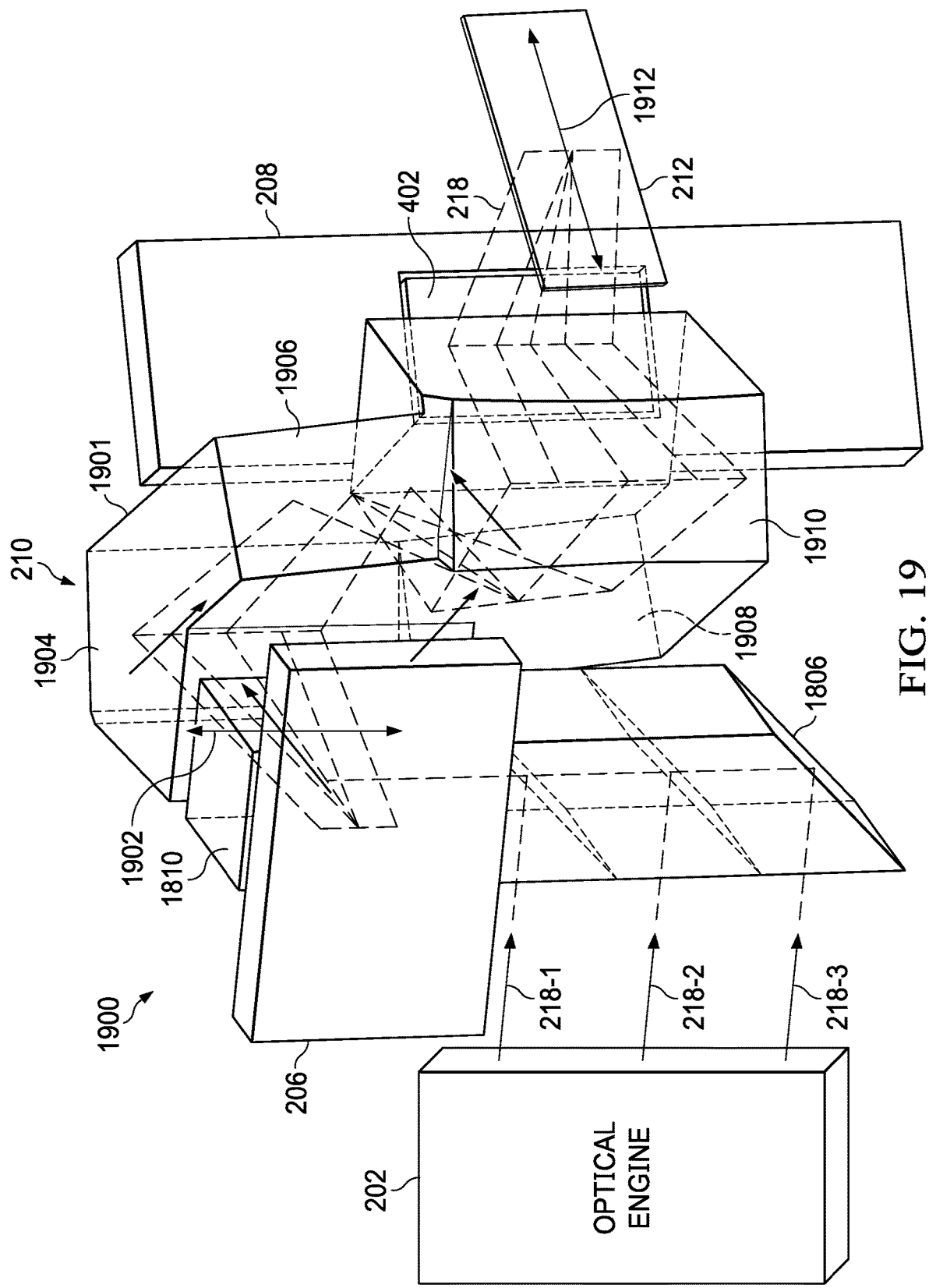
FIG. 19 is a diagram illustrating a laser projection system that includes a molded reflective relay disposed between two scan mirrors, and illustrating optical paths through the molded reflective relay, in accordance with some embodiments.

FIG. 19 shows a laser projection system 1900 (an example embodiment of the laser projection system 200 of FIG. 2) in which the optical relay 210 includes a molded reflective relay 1901, which may, according to various embodiments, correspond to one of the molded reflective relays 1102, 1302, and 1502 of FIGS. 11, 13, and 15, and further illustrates an example of paths that the concurrent laser lights 218 output by the optical engine 202 can take through the optical relay 210 for an embodiment in which the optical relay 210 is the molded reflective relay 1901. As shown, the optical engine 202 outputs red laser light 218-1, green laser light 218-2, and blue laser light 218-3 toward the beam combiner 1806. The beam combiner 1806 combines individual beams of the laser light 218-1, 218-2, 218-3 into the laser light 218, and redirects the laser light 218 toward the mirror 408, which reflects the laser light 218 onto the first scan mirror 206. The first scan mirror 206 scans the laser light 218 along a first scanning dimension 1902 into the optical relay 210. The optical relay 210 reflects the laser light 218 off of reflective surfaces 1904, 1906, 1908, and 1910, then outputs the laser light 218 toward the reflective surface 402 of the second scan mirror 208. The second scan mirror 208 then scans the laser light 218 across the incoupler 212 in a path (e.g., a substantially straight line or an arc) along a second scanning dimension 1912, where the laser light 218 converges onto the incoupler 212 at most or all achievable scan angles of the first scan mirror 206.

Figure 20:
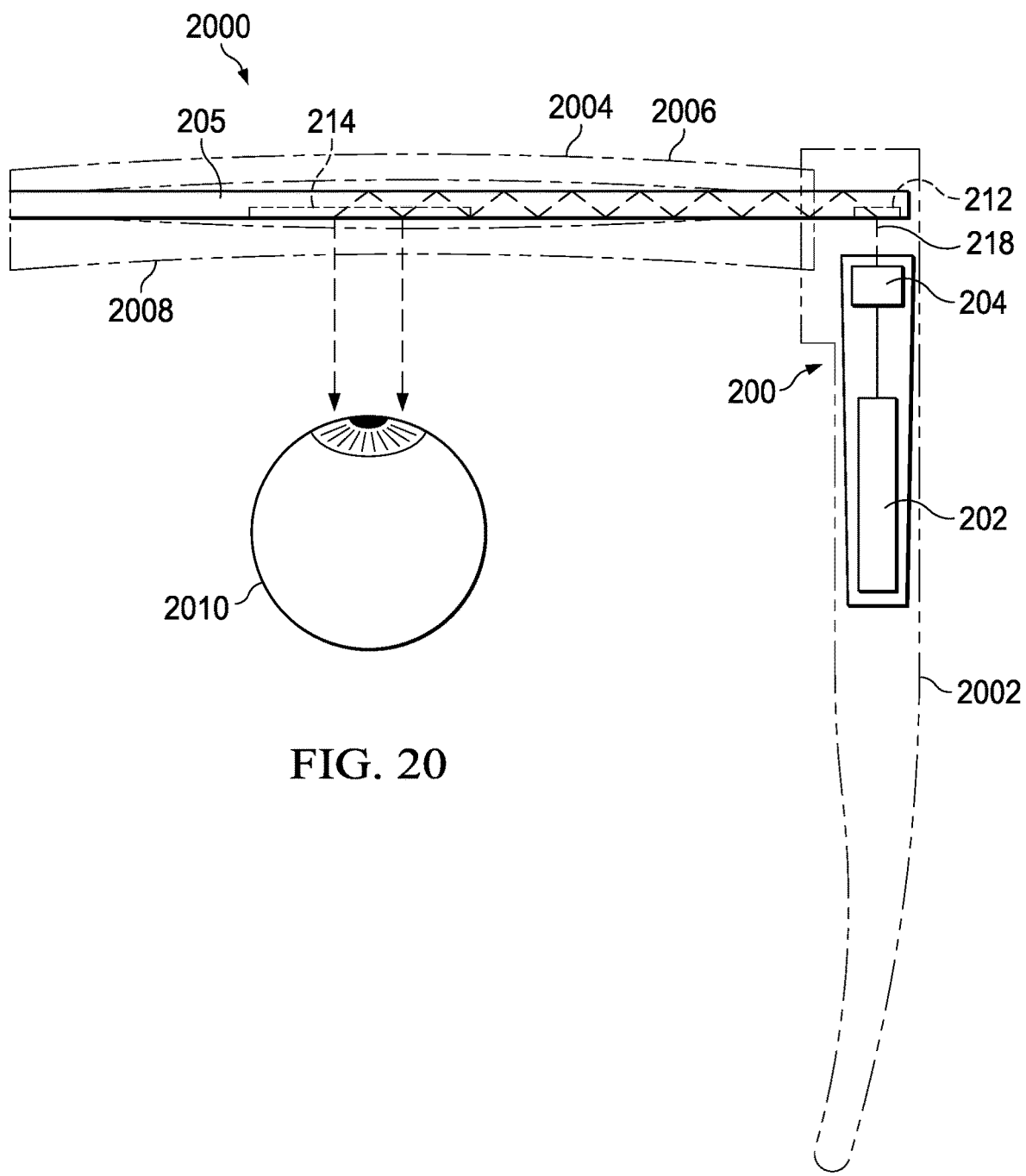
FIG. 20 is a diagram illustrating a partially transparent view of a display system that includes a laser projection system, in accordance with some embodiments.

FIG. 20 illustrates a cross-section view of a portion of an example WHUD 2000 that implements the laser projection system 200 of FIG. 2. In some embodiments, the WHUD 2000 represents the display system 100 of FIG. 1. The optical engine 202, the optical scanner 204, the incoupler 212, and a portion of the waveguide 205 are included in an arm 2002 of the WHUD 2000, in the present example.

The WHUD 2000 includes an optical combiner lens 2004, which includes a first lens 2006 a second lens 2008, and the waveguide 205, with the waveguide 205 disposed between the first lens 2006 and the second lens 2008. Light exiting through the outcoupler 214 travels through the second lens 2008 (which corresponds to, for example, the lens element 110 of the display system 100). In use, the laser light 218 exiting second lens 2008 enters the pupil of an eye 2010 of a user wearing the WHUD 2000, causing the user to perceive a displayed image carried by the laser light output by the optical engine 202. The optical combiner lens 2004 is substantially transparent, such that light from real-world scenes corresponding to the environment around the WHUD 2000 passes through the first lens 2006, the second lens 2008, and the waveguide 205 to the eye 2010 of the user. In this way, images or other graphical content output by the laser projection system 200 are combined (e.g., overlayed) with real-world images of the user's environment when projected onto the eye 2010 of the user to provide an AR experience to the user.

Although omitted from the depicted example for ease of illustration, in some embodiments additional optical elements are included in any of the optical paths between the optical engine 202 and the incoupler 212, in between the incoupler 212 and the outcoupler 214, or in between the outcoupler 214 and the eye 2010 of the user (e.g., in order to shape the laser light for viewing by the eye 2010 of the user). As an example, a prism is used to steer light from the optical scanner 204 into the incoupler 212 so that light is coupled into incoupler 212 at the appropriate angle to encourage propagation of the light in waveguide 205 by TIR. Also, in some embodiments, an exit pupil expander, such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 2010 of the user).

Figure 21:
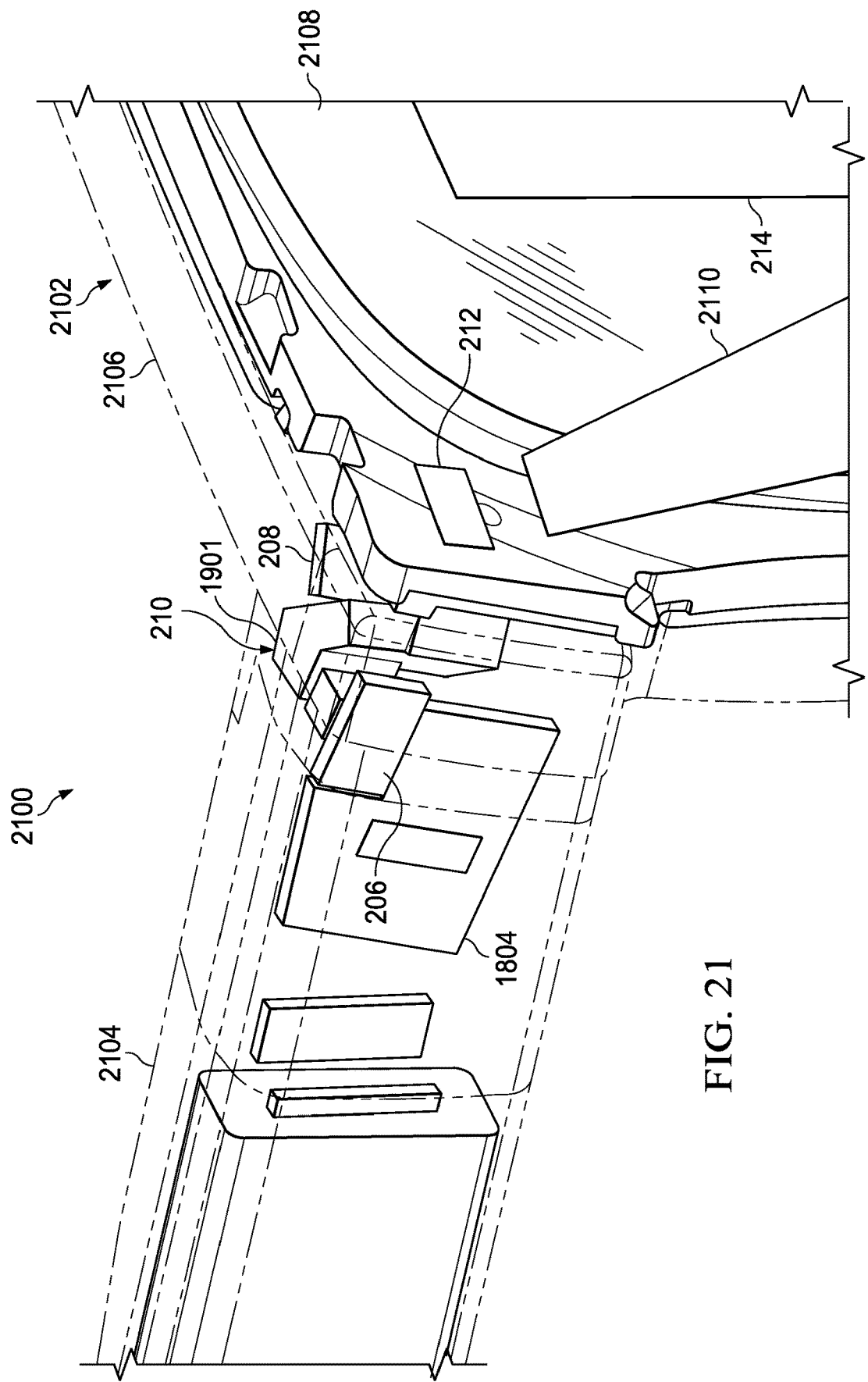
FIG. 21 is a diagram illustrating a partially transparent front isometric view of a laser projection system disposed within a WHUD, in accordance with some embodiments.
Figure 22:
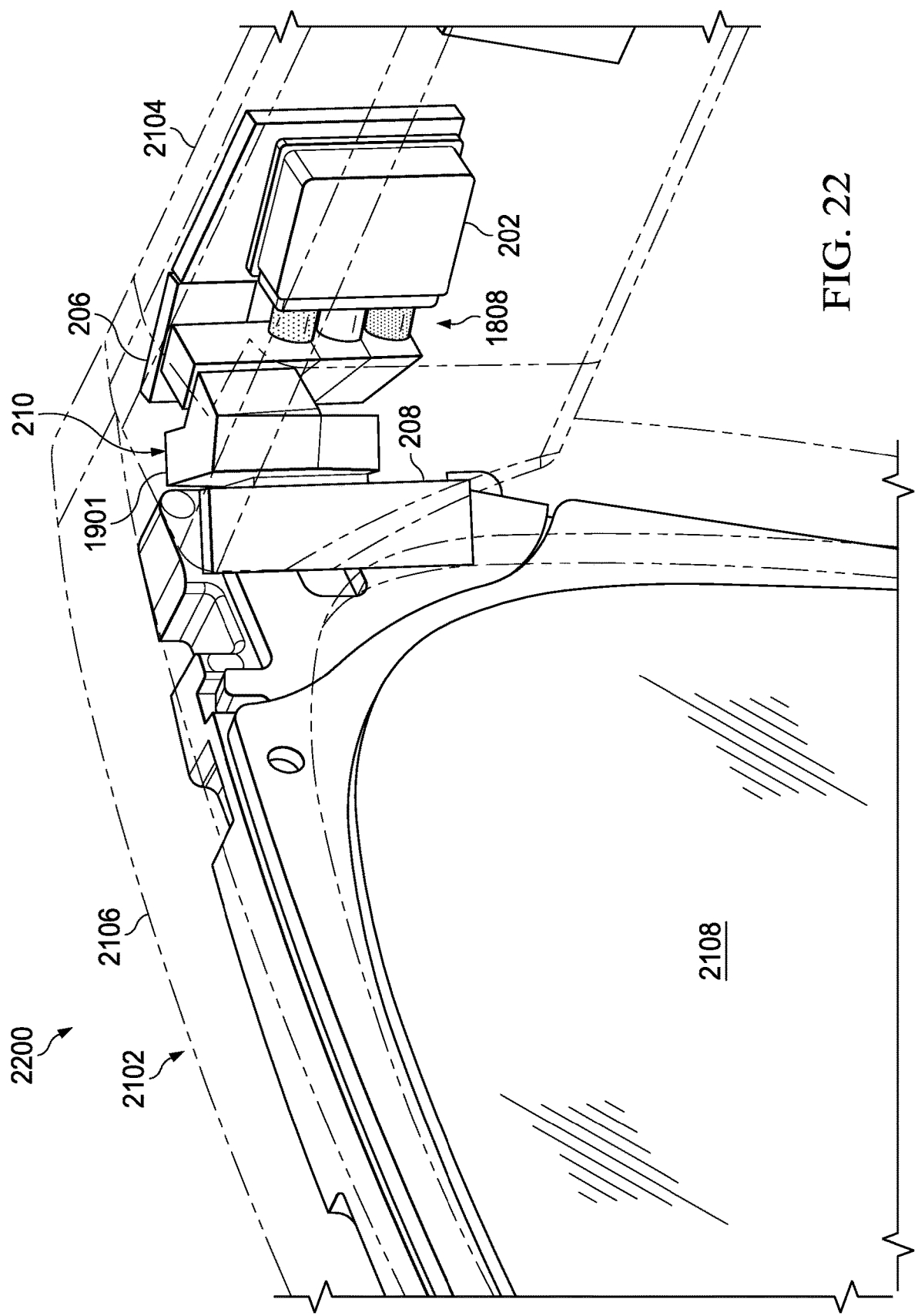
FIG. 22 is a diagram illustrating a partially transparent rear isometric view of a laser projection system disposed within a WHUD, in accordance with some embodiments.

FIGS. 21 and 22 show two different isometric, partially transparent views 2100 (FIG. 21) and 2200 (FIG. 22) of a portion of a WHUD 2102, which represents, for example, an embodiment of the WHUD 2000 of FIG. 20 or the display system 100 of FIG. 1. The WHUD 2102 includes an example arrangement of a laser projection system such as the laser projection system 200 of FIG. 2 or the laser projection system 1900 of FIG. 9 for an embodiment in which the optical relay 210 is a molded reflective relay 1901. In some embodiments, the WHUD 2102 corresponds to the display system 100 of FIG. 1, and the illustrated portion of the WHUD 2102 corresponds to the region 112 of the display system 100.

As shown by the views 2100 of FIG. 21 and 2200 of FIG. 22, the arm 2104 of the WHUD 2102 houses the optical engine 202, the primary lenses 406 and at least a portion of the first scan mirror 206, the optical relay 210, and the substrate 1804. A frame section 2106 of the WHUD 2102 houses the second scan mirror 208 and portions of the first scan mirror 206, the optical relay 210, and the substrate 1804. As shown by the view 2100 of FIG. 21, the incoupler 212 and the outcoupler 214 of the waveguide 205 (not fully shown in the views of FIGS. 21 and 22), are each embedded in or otherwise disposed on the lens 2108 (one embodiment of, for example, lens 110 of FIG. 1). As described previously, laser light output by the optical engine 202 (e.g., laser light 218) is routed to the incoupler 212 via at least the first scan mirror 206, the optical relay 210, and the second scan mirror 208. The first scan mirror 206 oscillates or otherwise rotates to scan the laser light along a first scanning dimension to scan the laser light along a line at the second scan mirror 208. The second scan mirror 208 oscillates or otherwise rotates to scan the received laser light along a second scanning dimension that is substantially perpendicular to the line at which the laser light is received at the second scan mirror 208. Laser light is relayed by the optical relay 210 such that it converges to a path (e.g., a substantially straight line or an arc) at the incoupler 212 upon being reflected by the second scan mirror 208. Relayed laser light received at the incoupler 212 is routed to the outcoupler 214 via the waveguide 205 (e.g., via TIR within the waveguide 205). The light received at the outcoupler 214 is then directed out of the waveguide 205 (e.g., toward the eye of a user of the WHUD 2102).

Figure 23:
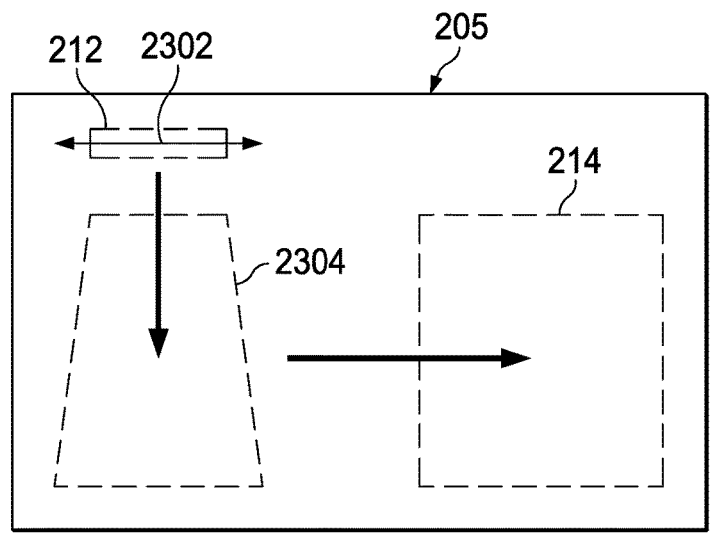
FIG. 23 is a diagram illustrating a waveguide having an incoupler, outcoupler, and exit pupil expander, in accordance with some embodiments.

FIG. 23 shows an example of light propagation within the waveguide 205 of the laser projection system 200 of FIG. 2 in accordance with some embodiments. As shown, light received via the incoupler 212 is scanned along a scanning dimension 2302 at the incoupler 212. The light is then directed into an exit pupil expander 2304, which reflects the light toward the outcoupler 214 to be output (e.g., toward the eye of a user). In some embodiments, the exit pupil expander 2304 (e.g., which may correspond to the exit pupil expander 2110 of FIG. 21) expands one or more dimensions of the eyebox of a WHUD (e.g., an embodiment of either of the WHUDs 2000, 2102 of FIGS. 20, 21, 22) that includes the laser projection system 200 (e.g., with respect to what the dimensions of the eyebox of the WHUD would be without the exit pupil expander 2304). In some embodiments, the incoupler 212 and the exit pupil expander 2304 each include respective one-dimensional diffraction gratings (i.e., diffraction gratings that extend along one dimension), which diffract incident light in a direction that is dependent on the angle of incidence of the incident light the structural aspects of the diffraction gratings. It should be understood that FIG. 23 shows a substantially ideal case in which the incoupler 212 directs light straight down (with respect to the presently illustrated view) in a first direction that is substantially perpendicular to the scanning dimension 2302, and the exit pupil expander 2304 directs light to the right (with respect to the presently illustrated view) in a second direction that is substantially perpendicular to the first direction. While not shown in the present example, it should be understood that, in some embodiments, the first direction in which the incoupler 212 directs light is slightly or substantially diagonal, rather than exactly perpendicular, with respect to the scanning dimension 2302.

Figure 24:
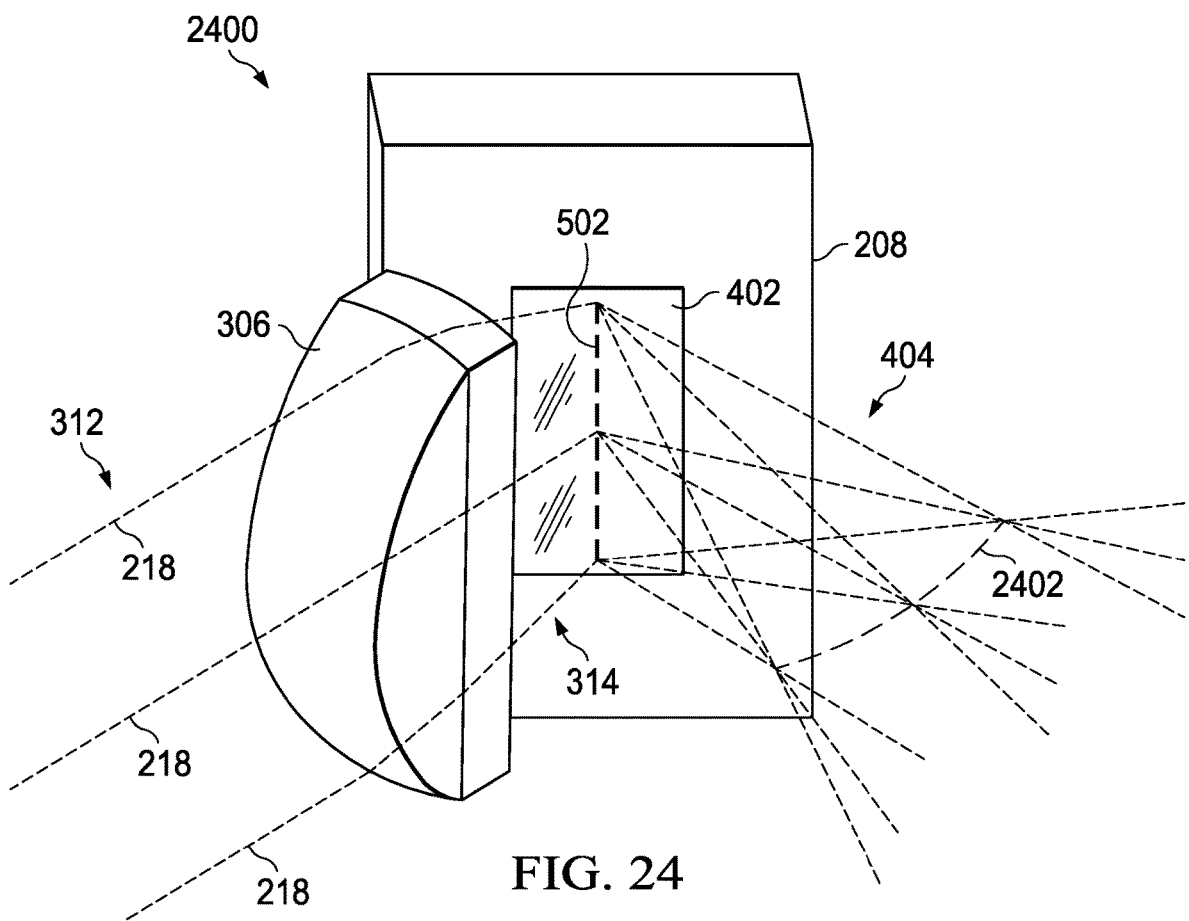
FIG. 24 is a diagram illustrating an isometric view of a portion of an optical scanner, depicting how laser light is scanned by a second scan mirror and converges to an exit pupil plane having a curved path after being output by an optical relay, in accordance with some embodiments.

Some of the examples above describe an optical scanner that causes scanned light to converge to a substantially linear path at an exit pupil plane that is coincident with a narrow rectangular incoupler. However, in other embodiments, the scanned light converges to an arc at the exit pupil plane, rather than along a straight line. FIG. 24 shows an illustrative isometric view 2400 of a portion of an embodiment of the optical scanner 204 (e.g., corresponding to one or more of the embodiments of FIGS. 3 and 4 that use a lens-based optical relay 210). Laser light 218 is scanned along a plane in the relay scan region 312 to the second lens 306. In the present example, a truncated view of the second lens 306 is provided to improve the visibility of the second scan mirror 208. The laser light 218 is relayed by the second lens 306 along the plane of the post-relay scan region 314 toward the line 502 upon which the laser light 218 is incident on the reflective surface 402 of the second scan mirror 208. The second scan mirror 208 reflects and scans the relayed laser light 218 along the second scanning dimension, which is substantially orthogonal to the line 502, such that the laser light 218 propagates along optical paths in the post-mirror scan region 404 to converge to an arc 2402 at the exit pupil plane. The convergence of the laser light 218 is caused by the laser light 218 being relayed by the second lens 306, in the present example.

Figure 25:
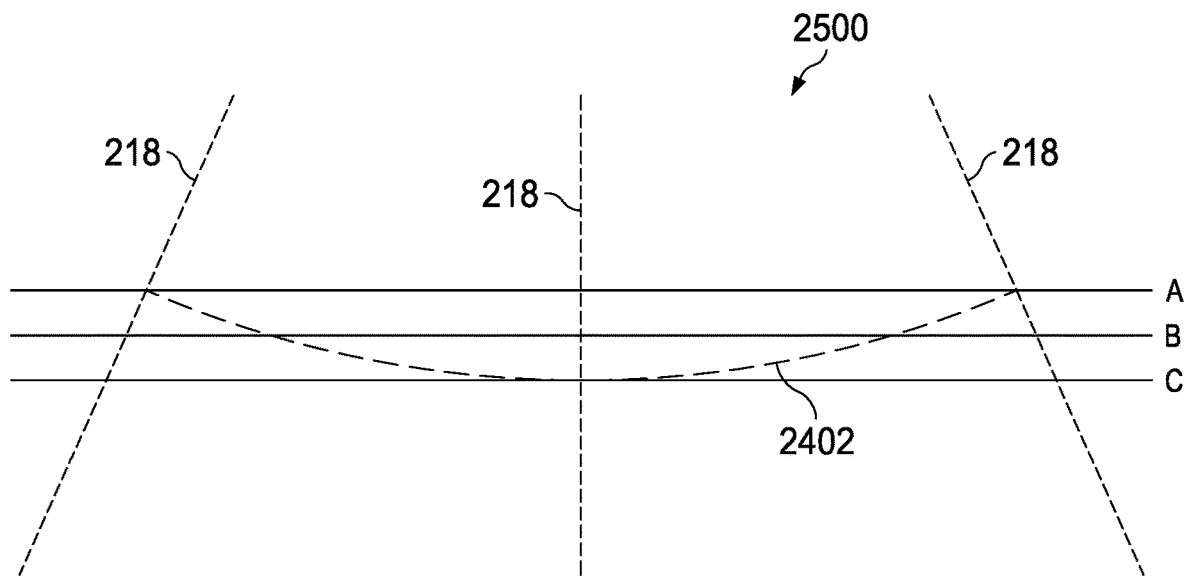
FIG. 25 is a diagram illustrating a top view of the curved path of the exit pupil plane of FIG. 25 and candidate positions at which the exit pupil plane may intersect the incoupler, in accordance with some embodiments.

FIG. 25 shows a top-down view 2500 of the arc 2402 of FIG. 24, with potential placements the incoupler 212 in relation to the arc 2402, labeled A, B, and C, respectively.

Figure 26:
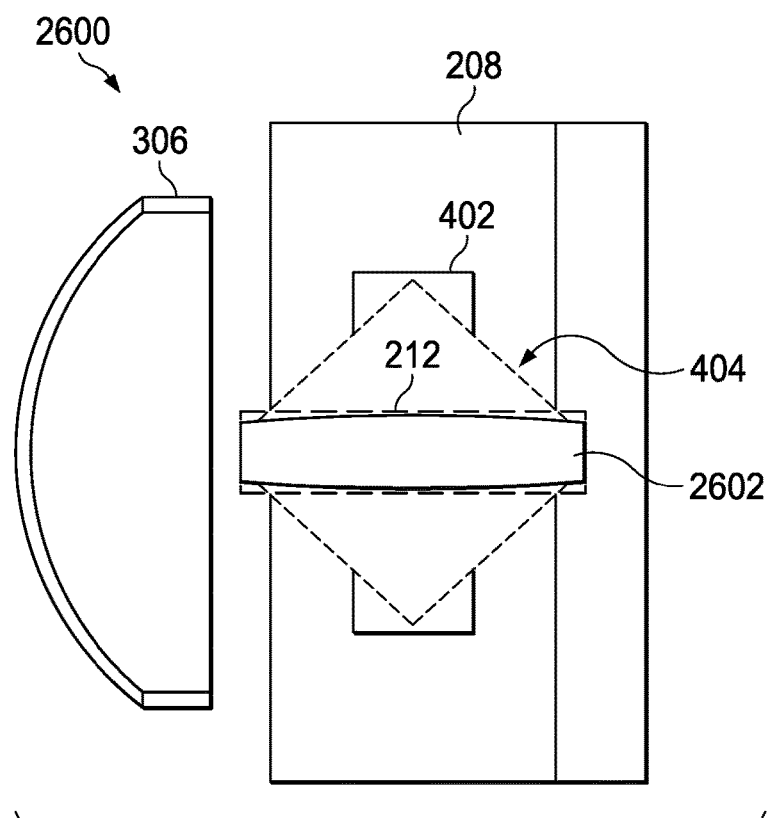
FIG. 26 is a diagram illustrating a cross-sectional side view of the portion of the optical scanner of FIG. 24 when the exit pupil plane intersects the incoupler at position A of FIG. 25, in accordance with some embodiments.

FIG. 26 shows a front view 2600 (e.g., in-plane with the incoupler 212), depicting an area 2602 of incidence of the light 218 at the incoupler 212 when the incoupler 212 is placed on line A in relation to the arc 2402 as depicted in FIG. 25. As shown, the smaller dimension (i.e., width) of the area 2602 is wider in the center than it is at the edges, with respect to the larger dimension (i.e., length) of the area 2602, since the arc 2402 only overlaps the incoupler 212 at these edges in the present example.

Figure 27:
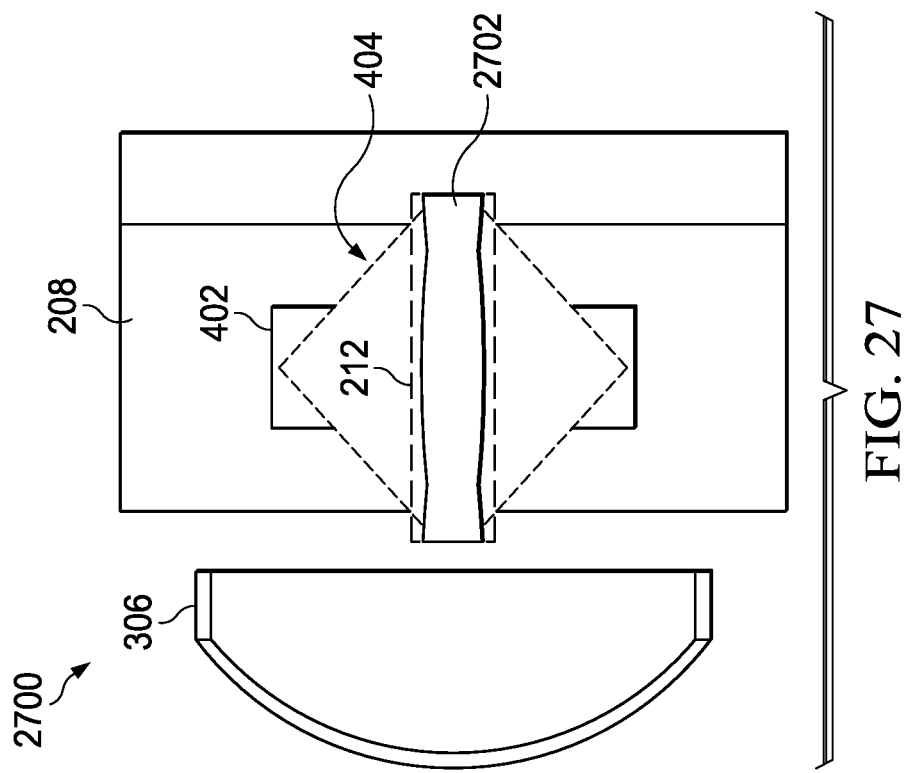
FIG. 27 is a diagram illustrating a cross-sectional side view of the portion of the optical scanner of FIG. 24 when the exit pupil plane intersects the incoupler at position B of FIG. 25, in accordance with some embodiments.

FIG. 27 shows a front view 2700 (e.g., in-plane with the incoupler 212), depicting an area 2702 of incidence of the light 218 at the incoupler 212 when the incoupler 212 is placed on line B in relation to the arc 2402 as depicted in FIG. 25. As shown, the smaller dimension (i.e., width) of the area 2702 is wider in the center and the edges, along the larger dimension (i.e., length) of the area 2702, and is narrower in the areas along its length at which the arc 2402 overlaps the incoupler 212 in the present example.

Figure 28:
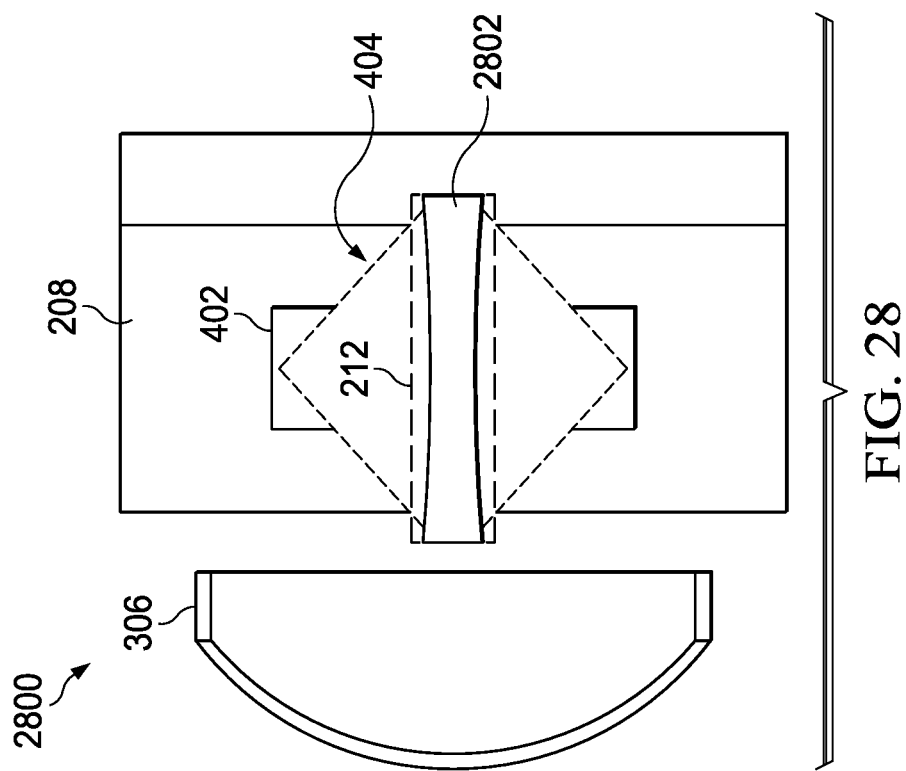
FIG. 28 is a diagram illustrating a cross-sectional side view of the portion of the optical scanner of FIG. 24 when the exit pupil plane intersects the incoupler at position C of FIG. 25, in accordance with some embodiments.

FIG. 28 shows a front view 2800 (e.g., in-plane with the incoupler 212) depicting an area 2802 of incidence of the light 218 at the incoupler 212 when the incoupler 212 is placed on line B in relation to the arc 2402 as depicted in FIG. 25. As shown, the smaller dimension (i.e., width) of the area 2802 is wider in the edges along the larger dimension (i.e., length) of the area 2802, and is narrower in the center along its length, since the arc 2402 only overlaps the incoupler 212 at its center in the present example.

Figure 29:
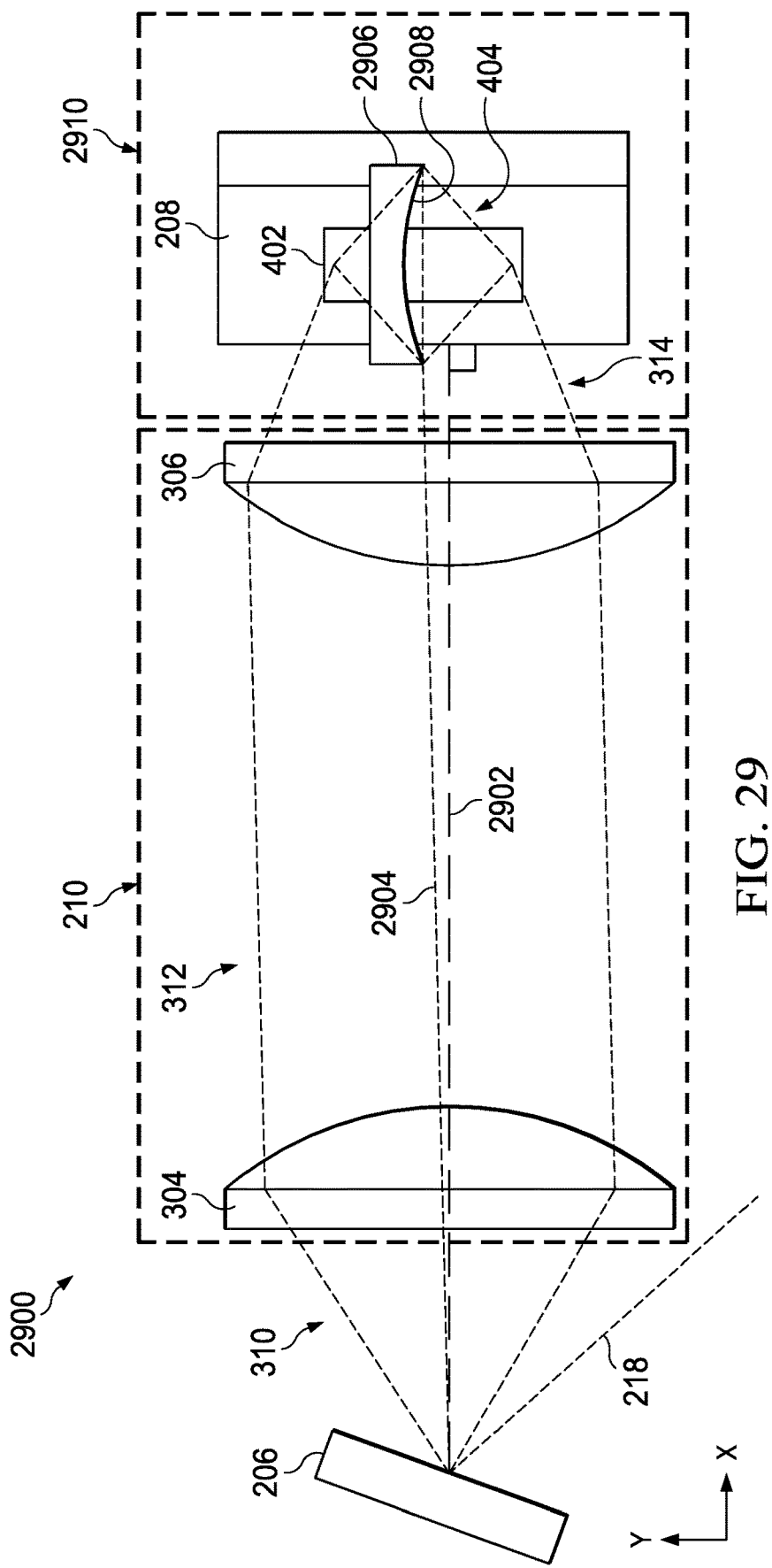
FIG. 29 is a diagram illustrating a side view of an optical scanner having an optical relay disposed between first and second scan mirrors, where the central ray of the light scanned by the first scan mirror is angled with respect to the second scan mirror and is incident on the second scan mirror at a non-orthogonal angle, in accordance with some embodiments.

FIG. 29 shows an illustrative side view of an optical scanner 2900 which corresponds, in the present example, to an embodiment of the optical scanner 204 of FIG. 2, in which the laser light 218 is scanned in an arc across the incoupler. In the present example, the second scan mirror 208 and a modified incoupler 2906 are disposed in a region 2910 following the optical relay 210. While the arrangement of the optical relay 210 in the present example is shown to correspond to that of FIGS. 3 and 4, it should be understood that other arrangements of the optical relay 210, such as the molded reflective relays of FIGS. 10-22 or the molded Offner-style relays of FIGS. 7-10, may instead be used in accordance with various embodiments. As shown, incoming laser light 218 is received by the first scan mirror 206 and scanned over a first dimension along the plane of the pre-relay scan region 310 toward the first lens 304, along the plane of the relay scan region 312 toward the second lens 306, along the plane of the post-relay scan region 314 toward the second scan mirror 208, and through the post-mirror scan region 404 to converge at an arc at a modified incoupler 2906. As shown, the central ray 2904 of the scanned laser light 218 is angled with respect to an orthogonal line 2902, which is aligned orthogonally or substantially orthogonally to the first and second lenses 304 and 306 and is perpendicular or substantially perpendicular to the long dimension of the reflective surface 402 of the can mirror 208. That is, the central ray 2904 is non-orthogonal with respect to the first and second lenses 304 and 306, is not perpendicular to the reflective surface 402 of the second scan mirror 208 along at least one dimensions and is not perpendicular to the modified incoupler 2906 or the waveguide that includes the modified incoupler 2906 along one or more dimensions, such that the laser light 218 is scanned in an arc across the modified incoupler 2906 (e.g., across a curved edge thereof). In some embodiments, the central ray 2904 is instead substantially orthogonal with respect to the first and second lenses 304 and 306, is not perpendicular is not perpendicular to any dimension of the reflective surface 402 of the second scan mirror 208 along at least one dimensions, and is not perpendicular to any dimension of the modified incoupler 2906 or the waveguide that includes the modified incoupler 2906 along one or more dimensions, such that the laser light 218 is scanned in an arc across the modified incoupler 2906 (e.g., across a curved edge thereof).

The modified incoupler 2906 is modified, with respect to a rectangular incoupler such as the incoupler 212 of FIG. 2, such that an edge 2908 of the modified incoupler 2906 is curved, rather than straight. The edge 2908 of the modified incoupler 2906 may be curved toward the center of the modified incoupler 2906, as shown in the present example, or may alternatively be curved away from the center of the modified incoupler 2906, depending on the angle of incidence of the central ray 2904 of the light 218 that is scanned across the curved edge 2908 of the modified incoupler 2906. The central ray 2904 can be tilted in this way either by inclining the first scan mirror 206 from the position needed to make the central ray 2904 normal to the second scan mirror 208 and the modified incoupler 2906 or by over-scanning the first scan mirror 206 and not using the laser light 218 corresponding to the over-scanned portion of the scan range to convey image data. In one example, the first scan mirror 206 is configurable to substantially match a FOV of the system by scanning an equal number of degrees on both sides of the nominal orientation of the first scan mirror 206 (e.g., around +/−5 degrees about the nominal orientation), and is separately configurable to over-scan the FOV by scanning the an unequal number of degrees on both sides (e.g., +6/−4 degrees about the normal orientation), such that a portion of the scanned laser light 218 falls outside of the FOV, a portion of the FOV does not receive the scanned laser light 218, the central ray 2904 of the scanned laser light 218 is angled with respect to normal (e.g., with respect to the orthogonal line 2902). In some embodiments, in the latter configuration of the first scan mirror 206 in the present example, the source of the laser light 218 (e.g., the optical engine 202 of FIG. 2) is turned off during time periods in which the first scan mirror 206 is oriented to reflect the laser light 218 to miss the FOV.

Figure 30:
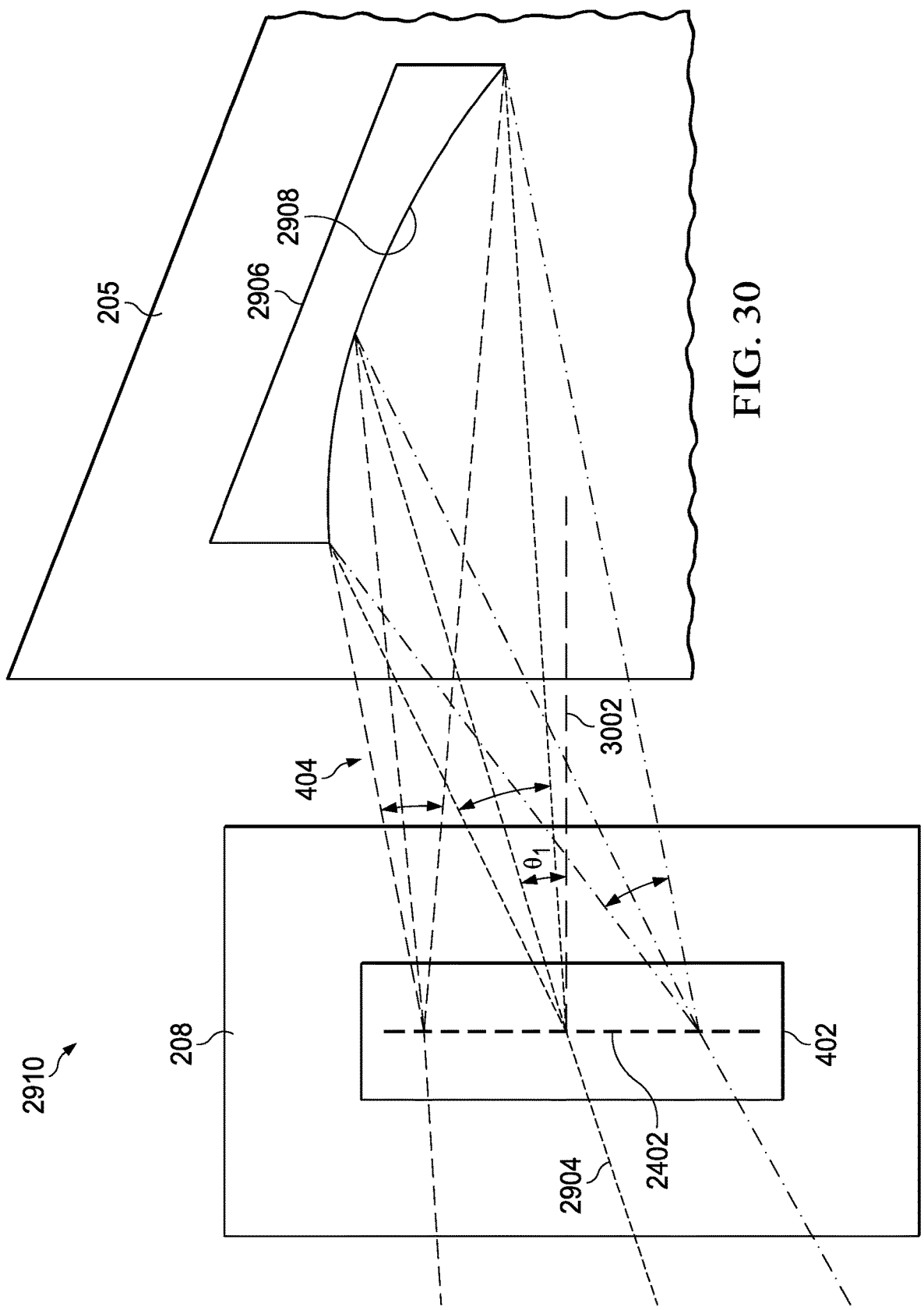
FIG. 30 is a diagram illustrating a region of the optical scanner of FIG. 29 and depicting how light incident on the second scan mirror is scanned across an arc corresponding to a curved edge of a modified incoupler, in accordance with some embodiments.

FIG. 30 shows an example of how the laser light 218 is scanned by the second scan mirror 208 of the optical scanner 2900 of FIG. 29 in an arc across the lower edge 2908 of the modified incoupler 2906. In the present example, the second scan mirror 208 is aligned such that the long dimension of the second scan mirror 208 and that of the reflective surface 402 are parallel to the waveguide 205 that includes the modified incoupler 2906. The central ray 2904 is offset from normal to the reflective surface 402, such that an angle 81 is formed between the central ray 2904 and an orthogonal line 3002 that is orthogonal to the plane of the waveguide 205, where the angle 81 is from about 0 degrees to about 15 degrees. In some embodiments in which the optical scanner 2900 is included in a display system such as the WHUD 2102 of FIGS. 21 and 22, the angle 81 substantially aligns the central ray 2904 with an arm of a display system (such as the arm 2104 of the WHUD 2102 of FIGS. 21 and 22), such that the angle 81 is a combination of the pantoscopic tilt angle of the display system and the angle of the arm. Upon reflection and scanning of the laser light 218 by the second scan mirror 208, the central ray 2904 is still angled offset from normal upon incidence at the curved edge 2908 of the modified incoupler 2906, such that the central ray 2904 is non-orthogonal to the modified incoupler 2906 and the waveguide 205.

By tilting the central ray of the scanned laser light 218 to be non-orthogonal with respect to the modified incoupler 2906 and the waveguide 205, as shown in the present example, the user-interface (UI) angle of the display system that includes the optical scanner 2900 is made to differ from the pantoscopic angle (sometimes referred to as "pantoscopic tilt") of the waveguide that includes the modified incoupler 2906. Herein, the UI angle is the angle at which a user perceives the display. By making the UI angle not equal to the pantoscopic tilt, design flexibility is improved such that either the pantoscopic tilt of the glasses can be varied or the UI can be varied independently from one another when designing the display system.

Figure 31:
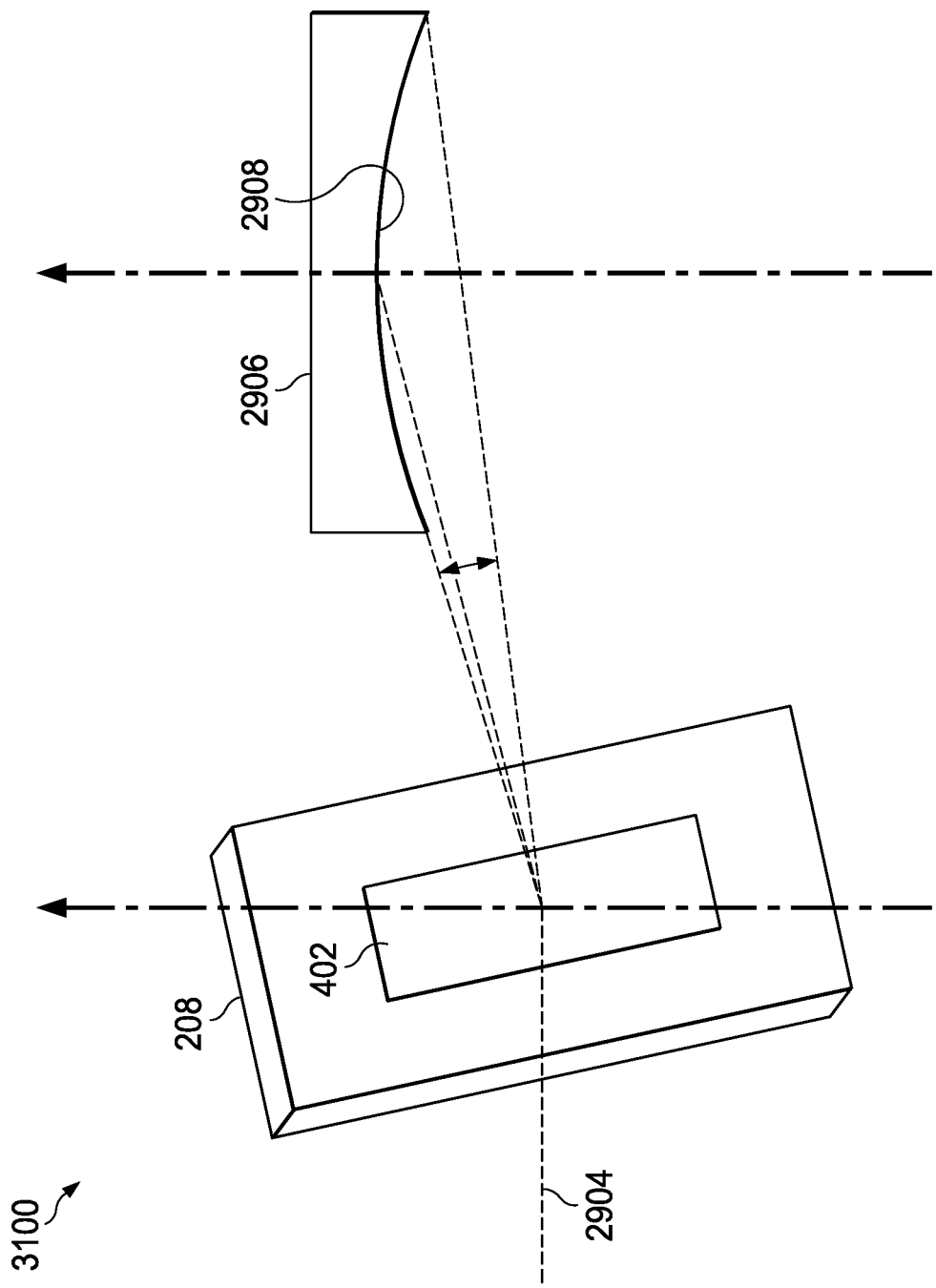
FIG. 31 is a diagram illustrating a portion of an optical scanner in which the second scan mirror is inclined with respect to the incoupler, such that the central ray of laser light scanned by the second scan mirror is incident on the incoupler at a non-orthogonal angle, in accordance with some embodiments.
Figure 32:
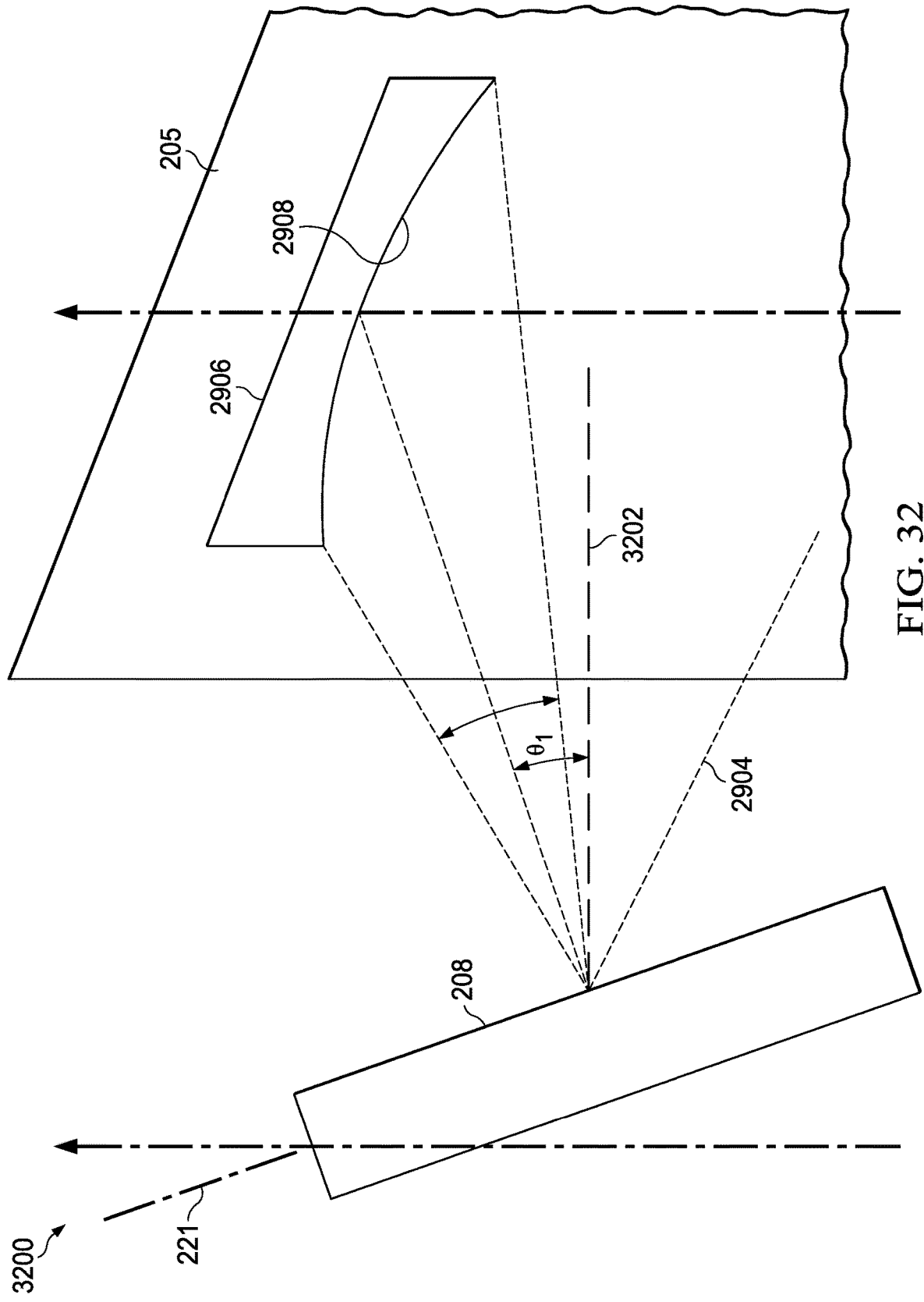
FIG. 32 is a diagram illustrating a side view, with respect to the second scan mirror, of the portion of the optical scanner of FIG. 31, depicting the incline of the second scan mirror, in accordance with some embodiments.

In some embodiments, rather than angling the central ray 2904 with respect to the waveguide 205 and the modified incoupler 2906 in order to scan the laser light 218 along an arc at the edge 2908 of the modified incoupler 2906 and to make the UI angle differ from the pantoscopic tilt of the waveguide 205, the second scan mirror 208 is instead inclined. FIGS. 31 and 32 show isometric views 3100 and 3200, respectively, of an illustrative portion of an optical scanner, such as the optical scanner 204 of FIG. 2, in which the second scan mirror 208 is inclined, rather than parallel, with respect to the waveguide 205 that includes the modified incoupler 2906. To avoid clutter, only the optical paths of the central ray 2904 before and after scanning by the second scan mirror 208 are illustrated in the present example, rather than the full scanning region of the laser light 218. As shown in the isometric view 3100, the second scan mirror 208 is tilted such that its long dimension is not aligned in parallel with the small dimension of the modified incoupler 2906, which causes the central ray 2904 to be reflected and scanned by the reflective surface 402 of the second scan mirror 208 along optical paths that are not perpendicular to any axis of the plane in which the modified incoupler 2906 lies. As illustrated in the isometric view 3200 of FIG. 32, the central axis extending along the long dimension of the second scan mirror 208 is offset from being perpendicular to the plane of the waveguide 205, such that the central ray 2904 is angularly offset from an orthogonal line 3202 that is orthogonal to the plane of the waveguide 205 by an angle of 81. As described above, the angle 81 is about 0 to about 15 degrees, according to various embodiments. In some embodiments, by angularly separating the central ray 2904 from the orthogonal line 3202 by tilting the second scan mirror 208, the central ray 2904 may substantially align the central ray 2904, after scanning by the second scan mirror 208, with an arm of the display system (e.g., arm 2104 of the WHUD 2102 of FIGS. 21 and 22), such that the angle 81 is a combination of the pantoscopic tilt angle of the display system and the angle of the arm. This causes the central ray 2904 to be scanned across the curved edge 2908 in an arc, which causes the UI angle of the laser projection system that includes the optical scanner of the present example to differ from the pantoscopic angle of the waveguide 205 that includes the modified incoupler 2906.

Figure 33:
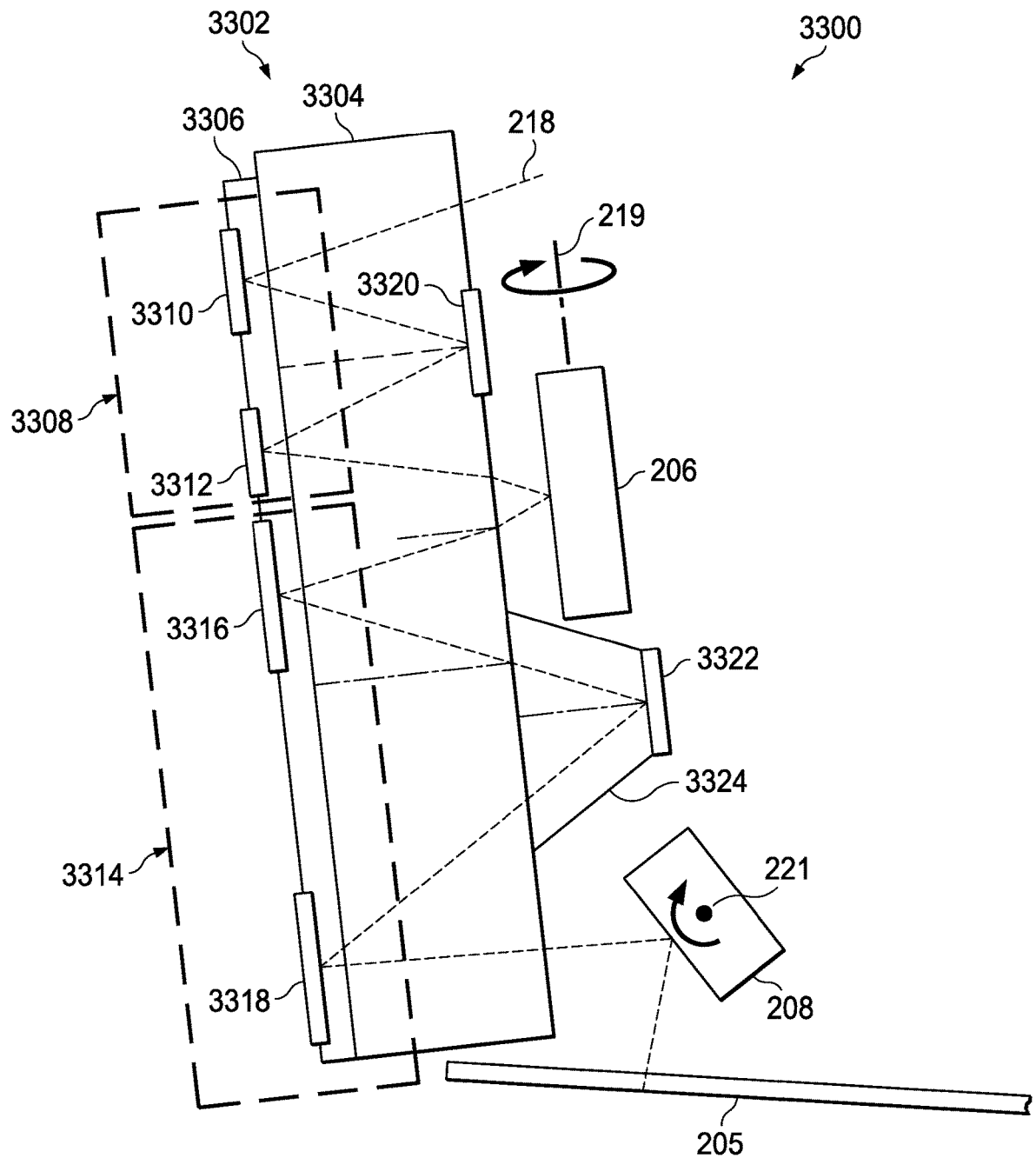
FIG. 33 is a diagram illustrating an optical scanner having an optical relay that includes metasurfaces formed on a glass wafer, in accordance with some embodiments.

FIG. 33 shows an example of an optical scanner 3300, which may correspond to the optical scanner 204 of FIG. 2, and which uses metasurfaces to replace the curved surfaces of the optical relay. The optical scanner 3300 includes the first and second scan mirrors 206 and 208, described previously, and an optical assembly 3302 that includes an optically clear glass block 3304 to which a glass wafer 3306 is bonded. Metasurfaces are fabricated onto the glass wafer 3306, such that the glass wafer 3306 includes a beam expander 3308 having a first beam expander metasurface 3310 and a second beam expander metasurface 3312, and further includes an optical relay 3314 having a first optical relay metasurface 3316 and a second optical relay metasurface 3318. During operation, laser light 218 is directed onto the first beam expander metasurface 3310, which expands the laser light 218 and reflects the laser light 218 toward a fold mirror 3320 disposed on an opposite side of the glass block 3304 from the glass wafer 3306. The fold mirror 3320 reflects the laser light 218 toward the second beam expander metasurface 3312, which further expands the laser light 218 (e.g., magnifying the laser light 218 in one or both of a first direction and a second direction, where the first and second directions are orthogonal or substantially orthogonal with respect to one another) and reflects the laser light 218 toward the first scan mirror 206. The first scan mirror 206 rotates or oscillates around a first axis 219 to scan the laser light 218 along a first scanning dimension and reflects the laser light 218 toward the first optical relay metasurface 3316. The first optical relay metasurface 3316 relays the laser light 218 toward a second fold mirror 3322, shown in the present example to be disposed on a glass prism 3324 that is bonded to the glass block 3304 opposite from the glass wafer 3306. The second fold mirror 3322 reflects the laser light 218 toward the second optical relay metasurface 3318, which relays the laser light 218 toward the second scan mirror 208. The first and second beam expander metasurfaces 3310 and 3312 and the first and second optical relay metasurfaces 3316 and 3318 are flat or substantially flat. The laser light 218 is scanned along a line at the second scan mirror 208, and the second scan mirror 208 rotates or oscillates about a second axis 221 to scan the laser light 218 along a second scanning dimension that is substantially perpendicular to the line at which the laser light is received by the second scan mirror 208. The laser light 218 converges to a line or arc of an exit pupil plane that is coincident with an incoupler (such as an embodiment of the incoupler 212 or an embodiment of the modified incoupler 2906 of FIGS. 2 and 29) of the waveguide 205. By using the flat or substantially flat first and second beam expander metasurfaces 3310 and 3312 and the flat or substantially flat first and second optical relay metasurfaces 3316 and 3318, rather than using curved reflective surfaces to achieve the corresponding optical functions, a comparatively smaller form factor for the optical relay 3314 and the optical scanner 3300 may be achieved.

Various embodiments described above are provided in the context of generating and routing laser light through an optical system. However, it should be understood that, in addition to or in place of such laser light and corresponding laser light sources, any collimated light sources and corresponding light may be used in conjunction with the described embodiments.

The display systems described herein may include one or more sensor(s) (e.g., microphone, camera, thermometer, compass, altimeter, or others) for collecting data from the user's environment. For example, one or more camera(s) may be used to provide feedback to the processor of the display system and influence where on the display(s) any given image should be displayed.

The display systems described herein may include one or more on-board power sources (e.g., one or more battery(ies)), a wireless transceiver for sending/receiving wireless communications, or a tethered connector port for coupling to a computer or charging the one or more on-board power source(s).

The display systems described herein may receive and respond to commands from the user in one or more of a variety of ways, including without limitation: voice commands through a microphone, touch commands through buttons, switches, or a touch sensitive surface, or gesture-based commands through gesture detection systems.

Herein, the term "communicative" as in "communicative pathway," "communicative coupling," and in variants such as "communicatively coupled," is generally used to refer to any engineered arrangement for transferring or exchanging information. Exemplary communicative pathways include, but are not limited to, electrically conductive pathways (e.g., electrically conductive wires, electrically conductive traces), magnetic pathways (e.g., magnetic media), or optical pathways (e.g., optical fiber), and exemplary communicative couplings include, but are not limited to, electrical couplings, magnetic couplings, or optical couplings. Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable or wearable electronic devices, not necessarily the exemplary electronic devices generally described above.

For instance, the foregoing detailed description has set forth various embodiments of the devices or processes via the use of block diagrams, schematics, and examples. Insofar as such block diagrams, schematics, and examples contain one or more functions or operations, it will be understood by those skilled in the art that each function or operation within such block diagrams, flowcharts, or examples can be implemented, individually or collectively, by a wide range of hardware, software, firmware, or virtually any combination thereof. Those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry or writing the code for the software and or firmware would be well within the skill of one of ordinary skill in the art in light of the teachings of this disclosure.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

What is claimed is:

1. A laser projection system comprising:
    a first scan mirror configured to scan laser light along a first scanning dimension;
    an optical relay configured to receive the laser light from the first scan mirror and to relay the laser light, wherein an entrance pupil of the optical relay is coincident with the first scan mirror;
    a second scan mirror configured to reflect the relayed laser light from the optical relay and to scan the relayed laser light along a second scanning dimension that is different than the first scanning dimension, wherein the first scan mirror is substantially coplanar with and disposed on a common surface with the second scan mirror; and
    a waveguide comprising an incoupler, wherein the second scan mirror is further configured to scan the relayed laser light along a path of an exit pupil plane at the incoupler.

2. The laser projection system claim 1, wherein the optical relay comprises:
    a first lens configured to receive the laser light from the first scan mirror; and
    a second lens configured to receive the laser light from the first lens and to relay the laser light to converge to the exit pupil plane that is coincident with the incoupler after the laser light exits the optical relay, wherein at least one of the first lens or the second lens is configured to reshape a cross-section of the laser light by magnifying the laser light in one or both of a first direction and a second direction, and wherein the first direction is substantially orthogonal to the second direction.

3. The laser projection system of claim 1, wherein the optical relay comprises a monolithic molded structure.

4. The laser projection system of claim 3, wherein the monolithic molded structure is an Offner-style relay that comprises:
    a first spherical mirror; and
    a second spherical mirror that is concentric with the first spherical mirror.

5. The laser projection system of claim 4, wherein the Offner-style relay further comprises:
    a first fold mirror configured to receive the laser light from the first scan mirror and to reflect the laser light toward a first portion of the first spherical mirror;
    a second fold mirror; and
    wherein the first portion of the first spherical mirror is configured to relay the laser light toward the second spherical mirror, the second spherical mirror is configured to relay the laser light toward a second portion of the first spherical mirror, the second portion of the first spherical mirror is configured to relay the laser light toward the second fold mirror, the second fold mirror is configured to reflect the laser light out of the optical relay toward the second scan mirror, and the second portion of the first spherical mirror is configured to relay the laser light to converge to the exit pupil plane that is coincident with the incoupler after the laser light exits the optical relay.

6. The laser projection system of claim 3, wherein the monolithic molded structure is a molded reflective relay that comprises:
    a first curved mirror configured to receive the laser light from the first scan mirror and to relay and reflect the laser light; and a second curved mirror configured to receive the laser light from the first curved mirror and to relay and reflect the laser light out of the optical relay toward the second scan mirror.

7. The laser projection system of claim 6, wherein the first curved mirror is configured to cause the laser light to converge to an intermediate image plane disposed between the first curved mirror and the second curved mirror, and wherein the second curved mirror is configured to relay the laser light to converge to the exit pupil plane that is coincident with the incoupler after the laser light exits the optical relay.

8. The laser projection system of claim 7, wherein the molded reflective relay further comprises:
a first fold mirror disposed in an optical path between the first curved mirror and the second curved mirror following the intermediate image plane, wherein the first fold mirror is configured to receive the laser light output from the intermediate image plane and to reflect the laser light toward the second curved mirror.

9. The laser projection system of claim 8, wherein the molded reflective relay further comprises:
a second fold mirror disposed in an optical path between the first curved mirror and the first fold mirror, prior to the intermediate image plane, wherein the second fold mirror is configured to receive the laser light from the first curved mirror and to reflect the laser light toward the first fold mirror via the intermediate image plane.

10. The laser projection system of claim 1, further comprising:
an optical engine comprising a plurality of laser light sources, each configured to output a respectively different wavelength of laser light;
a plurality of primary lenses comprising a respective primary lens for each of the wavelengths of laser light output by the optical engine; and
a beam combiner configured to receive the wavelengths of laser light from the optical engine via the primary lenses and to combine the wavelengths of laser light to produce the laser light that the first scan mirror is configured to receive.

11. The laser projection system of claim 10, wherein the waveguide further comprises:
an exit pupil expander comprising a diffraction grating configured to receive the relayed laser light from the incoupler, wherein the incoupler is configured to redirect the relayed laser light toward the exit pupil expander in a first direction that is substantially perpendicular to the path across which the relayed laser light is scanned across the incoupler; and
an outcoupler that is configured to receive the laser light from the diffraction grating of the exit pupil expander and to redirect the relayed laser light out of the waveguide, wherein the diffraction grating of the exit pupil expander is configured to redirect the laser light toward the outcoupler in a second direction that is substantially perpendicular to the first direction.

* * * * *